(12) United States Patent
Montagna et al.

(10) Patent No.: US 12,320,404 B2
(45) Date of Patent: Jun. 3, 2025

(54) DAMPER ASSEMBLY

(71) Applicant: DRiV Automotive Inc., Skokie, IL (US)

(72) Inventors: Franky Montagna, Bilzen (BE);
Werner Bosmans, Beringen (BE);
Frederik Baldoni, Borgloon (BE);
Simon Anne de Molina, Namur (BE);
Ruben Evens, Hasselt (BE); Ronny Vanbrabant, Heusden-Zolder (BE);
Rahul Popatrao Ekatpure, Sint-Truiden (BE)

(73) Assignee: DRiV Automotive Inc., Skokie, IL (US)

( * ) Notice: Subject to any disclaimer, the term of this patent is extended or adjusted under 35 U.S.C. 154(b) by 94 days.

(21) Appl. No.: 17/935,349

(22) Filed: Sep. 26, 2022

(65) Prior Publication Data

US 2023/0019332 A1    Jan. 19, 2023

Related U.S. Application Data

(63) Continuation of application No. PCT/US2021/024469, filed on Mar. 26, 2021.
(Continued)

(51) Int. Cl.
*F16F 9/32* (2006.01)
*B60G 13/08* (2006.01)
(Continued)

(52) U.S. Cl.
CPC .............. *F16F 9/3235* (2013.01); *F16F 9/19* (2013.01); *F16F 9/3484* (2013.01);
(Continued)

(58) Field of Classification Search
CPC .......... F16F 9/19; F16F 9/3235; F16F 9/3484; F16F 9/3488; F16F 9/3482; F16F 9/3486;
(Continued)

(56) References Cited

U.S. PATENT DOCUMENTS 3,038,562 A    6/1962    Bourcier
4,512,447 A    4/1985    Miura
(Continued)

FOREIGN PATENT DOCUMENTS

DE    112017007198 T5    11/2019
KR    100443884 B1    8/2004
WO    2019069413 A1    4/2019

OTHER PUBLICATIONS

Non-Final Office Action dated Jan. 25, 2024 issued in related U.S. Appl. No. 18/335,382 (28 pages).
(Continued)

*Primary Examiner* — Bradley T King
*Assistant Examiner* — James K Hsiao
(74) *Attorney, Agent, or Firm* — Harness, Dickey & Pierce, P.L.C.

(57) ABSTRACT

A damper assembly includes a rod elongated along an axis. The damper assembly includes a body supported by the rod, the body having a first surface and a second surface opposite the first surface. The body and the rod define a passage between the body and the rod, the passage extending from the first surface of the body to the second surface of the body.

19 Claims, 39 Drawing Sheets

Related U.S. Application Data

(60) Provisional application No. 63/001,013, filed on Mar. 27, 2020, provisional application No. 63/090,475, filed on Oct. 12, 2020, provisional application No. 63/090,510, filed on Oct. 12, 2020.

(51) Int. Cl.
   *B60G 17/08*     (2006.01)
   *F16F 9/19*      (2006.01)
   *F16F 9/348*     (2006.01)
   *F16F 9/50*      (2006.01)

(52) U.S. Cl.
   CPC ............ *F16F 9/3488* (2013.01); *F16F 9/50* (2013.01); *B60G 13/08* (2013.01); *B60G 17/08* (2013.01); *B60G 2202/24* (2013.01); *B60G 2204/62* (2013.01); *B60G 2206/41* (2013.01); *B60G 2500/112* (2013.01); *B60G 2800/162* (2013.01); *F16F 2222/12* (2013.01); *F16F 2228/066* (2013.01); *F16F 2230/183* (2013.01); *F16F 2232/08* (2013.01); *F16F 2234/02* (2013.01)

(58) Field of Classification Search
   CPC .... F16F 9/50; F16F 2222/12; F16F 2228/066; F16F 2230/183; F16F 2232/08; F16F 2234/02; B60G 17/08; B60G 13/08; B60G 2202/24; B60G 2204/62; B60G 2206/41; B60G 2500/112; B60G 2800/162
   See application file for complete search history.

(56) References Cited

U.S. PATENT DOCUMENTS

| | | | | |
|---|---|---|---|---|
| 4,953,671 A | * | 9/1990 | Imaizumi | F16F 9/512 188/282.3 |
| 4,972,929 A | | 11/1990 | Ivers et al. | |
| 5,018,608 A | * | 5/1991 | Imaizumi | F16F 9/50 188/282.5 |
| 5,106,053 A | | 4/1992 | Miller et al. | |
| 5,129,488 A | * | 7/1992 | Furuya | F16F 9/5126 188/317 |
| 5,226,512 A | | 7/1993 | Kanari | |
| 5,293,971 A | * | 3/1994 | Kanari | F16F 9/348 188/282.1 |
| 5,316,113 A | * | 5/1994 | Yamaoka | F16F 9/3484 188/320 |
| 5,332,069 A | | 7/1994 | Murakami | |
| 5,413,195 A | | 5/1995 | Murakami | |
| 5,497,862 A | * | 3/1996 | Hoya | F16F 9/468 188/282.5 |
| 5,529,154 A | | 6/1996 | Tanaka | |
| 5,988,330 A | | 11/1999 | Morris | |
| 6,340,081 B1 | * | 1/2002 | Keil | F16F 9/348 188/322.22 |
| 6,382,372 B1 | * | 5/2002 | Keil | F16F 9/512 188/322.15 |
| 6,460,664 B1 | * | 10/2002 | Steed | F16F 9/348 188/282.1 |
| 6,474,454 B2 | | 11/2002 | Matsumoto et al. | |
| 6,634,379 B2 | * | 10/2003 | Asadi | F16F 9/3484 137/512.1 |
| 6,668,986 B2 | | 12/2003 | Moradmand et al. | |
| 6,672,436 B1 | | 1/2004 | Keil et al. | |
| 7,322,449 B2 | * | 1/2008 | Yamaguchi | F16F 9/348 188/282.3 |
| 7,694,786 B2 | | 4/2010 | Asadi et al. | |
| 8,042,661 B2 | | 10/2011 | Ota et al. | |
| 8,302,746 B2 | * | 11/2012 | Azekatsu | F16F 9/5126 188/322.15 |
| 8,820,495 B2 | | 9/2014 | King | |
| 9,182,005 B2 | | 11/2015 | Goldasz et al. | |
| 9,249,854 B2 | * | 2/2016 | Kim | F16F 9/348 |
| 9,261,160 B2 | * | 2/2016 | Lee | F16F 9/5126 |
| 9,291,231 B2 | * | 3/2016 | Kim | F16F 9/5126 |
| 9,297,436 B2 | * | 3/2016 | Morita | F16K 15/144 |
| 9,410,595 B2 | * | 8/2016 | Yamada | F16F 9/3481 |
| 9,587,703 B2 | | 3/2017 | Rummel | |
| 9,631,695 B2 | * | 4/2017 | De Kock | F16F 9/44 |
| 9,777,790 B2 | | 10/2017 | Mizuno et al. | |
| 9,845,839 B2 | * | 12/2017 | Rummel | F16F 9/18 |
| 9,982,739 B2 | * | 5/2018 | De Kock | F16F 9/3481 |
| 10,012,283 B2 | * | 7/2018 | Yamashita | F16F 9/486 |
| 10,203,016 B2 | * | 2/2019 | Mizuno | F16F 9/512 |
| 10,544,852 B2 | | 1/2020 | Inagaki et al. | |
| 10,619,694 B2 | * | 4/2020 | Yamashita | F16F 9/19 |
| 2005/0056505 A1 | * | 3/2005 | Deferme | F16F 9/3485 188/283 |
| 2005/0056506 A1 | | 3/2005 | Deferme | |
| 2005/0263363 A1 | | 12/2005 | Katou et al. | |
| 2008/0041682 A1 | * | 2/2008 | De Kock | F16F 9/3485 188/322.15 |
| 2008/0314704 A1 | | 12/2008 | Deferme | |
| 2009/0242341 A1 | | 10/2009 | Ashiba et al. | |
| 2009/0260938 A1 | | 10/2009 | Hikosaka | |
| 2011/0147147 A1 | * | 6/2011 | Murakami | F16F 9/464 188/314 |
| 2012/0018264 A1 | | 1/2012 | King | |
| 2013/0025446 A1 | | 1/2013 | Ashiba et al. | |
| 2013/0333993 A1 | * | 12/2013 | Yu | F16F 9/3214 188/322.22 |
| 2014/0048366 A1 | | 2/2014 | Lee et al. | |
| 2014/0231199 A1 | * | 8/2014 | Kim | F16F 9/34 188/313 |
| 2014/0252735 A1 | * | 9/2014 | Yamashita | F16F 9/342 188/282.1 |
| 2014/0262655 A1 | * | 9/2014 | Tuts | F16F 9/512 188/322.15 |
| 2014/0265203 A1 | | 9/2014 | Zuleger et al. | |
| 2014/0332332 A1 | * | 11/2014 | Lawler | F16F 9/3484 188/313 |
| 2015/0041269 A1 | * | 2/2015 | Lim | F16F 9/3485 188/322.15 |
| 2015/0114774 A1 | * | 4/2015 | Kim | F16F 9/3485 188/322.15 |
| 2016/0146286 A1 | * | 5/2016 | Rummel | F16F 9/3484 188/313 |
| 2016/0258504 A1 | | 9/2016 | Mizuno et al. | |
| 2016/0356335 A1 | * | 12/2016 | Nomura | F16F 9/19 |
| 2018/0259029 A1 | * | 9/2018 | Yamashita | F16F 9/5126 |
| 2018/0355945 A1 | | 12/2018 | De Kock | |
| 2019/0226546 A1 | | 7/2019 | Förster | |
| 2019/0271373 A1 | | 9/2019 | Cox | |
| 2019/0285130 A1 | | 9/2019 | Rösseler et al. | |
| 2019/0331193 A1 | | 10/2019 | Förster | |
| 2020/0271186 A1 | * | 8/2020 | Yamashita | F16F 9/348 |
| 2021/0054902 A1 | | 2/2021 | Nakano | |

OTHER PUBLICATIONS

International Search Report and Written Opinion of International Searching Authority regarding International Application No. PCT/US2021/024469 mailed Jul. 9, 2021 (11 pages).

USPTO Notice of Allowance mailed Mar. 17, 2023 for U.S. Appl. No. 17/214,265 (65 pages).

Non-Final Office Action dated Mar. 18, 2024 issued in related matter U.S. Appl. No. 18/335,382 (22 pages).

* cited by examiner

DAMPER ASSEMBLY

CROSS-REFERENCE TO RELATED APPLICATIONS

The subject patent application is a continuation of, and claims priority to, International Application PCT/US2021/024469 filed on Mar. 26, 2021, Provisional Patent Application U.S. 63/001,013 filed on Mar. 27, 2020, Provisional Patent Application U.S. 63/090,475 filed on Oct. 12, 2020, and Provisional Patent Application U.S. 63/090,510 filed on Oct. 12, 2020, all four of which are herein incorporated by reference in their entirety.

BACKGROUND

Dampers are typically used in conjunction with automotive suspension systems or other suspension systems to control movement of wheels of a vehicle relative to a body of the vehicle. In order to control movement, dampers are generally connected between the sprung (body) and the unsprung (suspension/drivetrain) masses of the vehicle.

The dampers control movement of the wheels by limiting fluid flow past a piston of the damper. The fluid flows past the piston, e.g., via passages of the piston when the damper is moved toward a compressed or extended position. The passages may have a fixed opening size. Resistance to movement is provided by the passages limiting an amount of fluid that flows therethrough. The resistance to movement may increase exponentially as movement speed is increased.

Discs may be used to control flow of fluid though the passages, e.g., by flexing or translating to increase or decrease a size of an opening at one end of the passage. Changing the opening size may change force response characteristics of the damper assembly. For example, increasing the opening size may decrease resistance to movement and decreasing the opening size may increase resistance to movement.

It is desired to have further tunability to control the force response of the damper, and to have reduced manufacturing costs and packaging size.

SUMMARY

A damper assembly that defines a passage between a body and a rod provides decreased packaging size and increased assembly and tuning flexibility.

A damper assembly includes a rod elongated along an axis. The damper assembly includes a body supported by the rod, the body having a first surface and a second surface opposite the first surface. The body and the rod define a passage between the body and the rod, the passage extending from the first surface of the body to the second surface of the body.

The body may define a second passage extending from the first surface to the second surface, and the damper assembly may include a blow off disc supported by the rod and selectively permitting fluid flow out of the second passage of the body, the rod and the blow off disc defining the passage.

The damper assembly may include a spring disc supported by the rod and urging the blow off disc toward the body, the rod and the spring disc defining the passage.

The body, the blow off disc, and the spring disc may each include a notch, the notches defining the passage.

The body, the blow off disc, and the spring disc may each include a second notch, and the rod may include a rib disposed in the second notches.

The rod may include an axially elongated flat defining the passage.

The damper assembly may include a flow disc supported by the rod, the flow disc defining a radial passage in fluid communication with the passage.

The damper assembly may include a check disc supported by the rod, the check disc selectively restricting fluid flow through the passage in a first direction.

The check disc may selectively restrict fluid flow through the passage in a second direction opposite the first direction.

The damper assembly may include a second check disc supported by the rod, the second check disc selectively restricting fluid flow through the passage in a second direction opposite the first direction.

The damper assembly may include a housing supported by the rod, the housing defining a chamber in fluid communication with the passage, the check disc in the chamber.

The check disc may be movable from an unflexed position toward the housing to a flexed position.

The housing may include a rib extending toward the check disk.

The rib may include a channel.

The damper assembly may include an orifice disc in the chamber.

The damper assembly may include a second orifice disc in the chamber, the check disc between the orifice disc and the second orifice disc.

The damper assembly may include a top disc further defining the chamber, the top disc having an opening in fluid communication with the chamber.

The top disc may include a rib that extends toward the housing.

The rib may define a channel.

The damper assembly may include a second check disk in the chamber and selectively restricting fluid flow through the passage in a second direction opposite the first direction.

DETAILED DESCRIPTION

Figure 1:
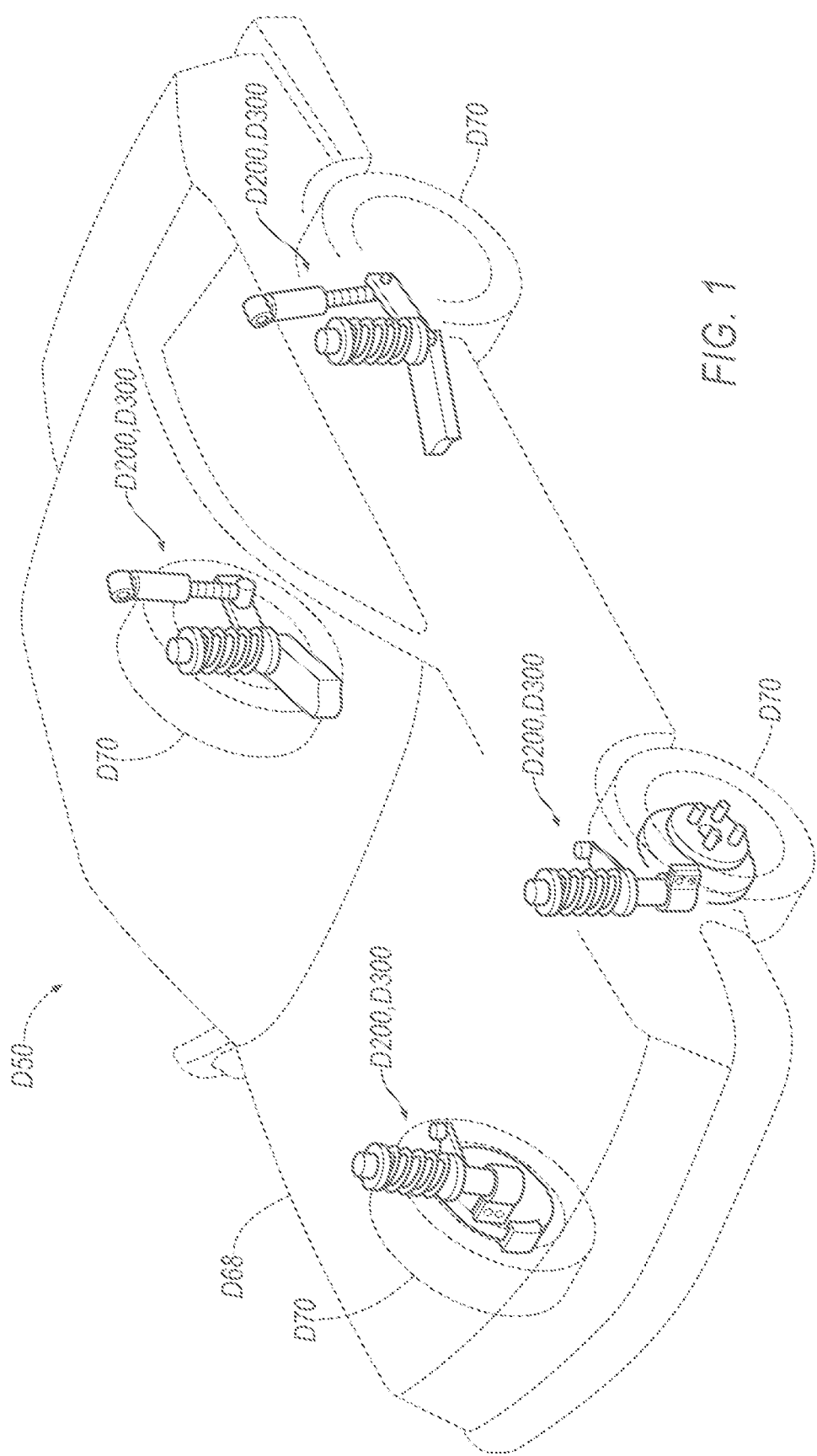
FIG. 1 is a perspective view of a vehicle having a plurality of damper assemblies.
Figure 2:
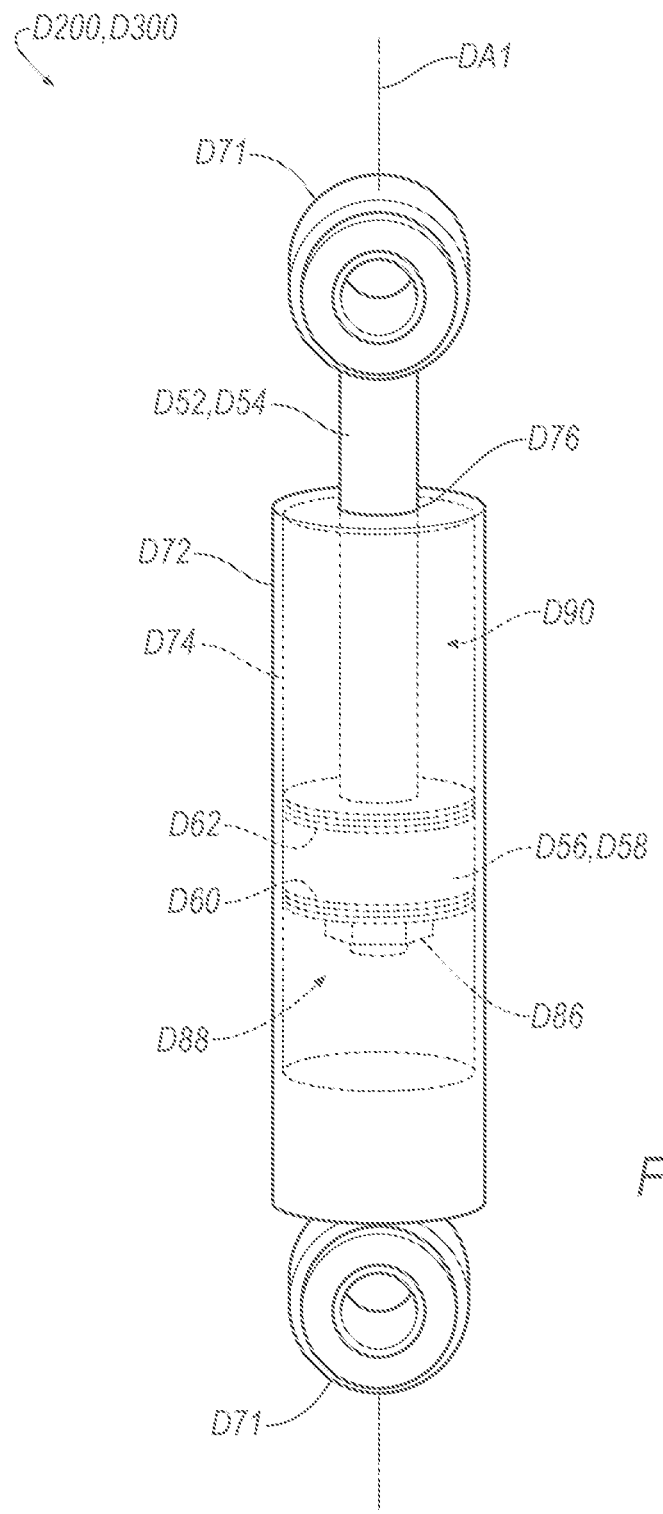
FIG. 2 is a perspective view of one of the damper assemblies.

With reference to FIGS. 1-13, wherein like numerals indicate like parts throughout the several views, a damper assembly D200, D300 for a vehicle D50 includes a rod D52, D54 elongated along an axis A1. The damper assembly D200, D300 includes a piston D56, D58 supported by the rod D52, D54, the piston D56, D58 having a first surface D60 and a second surface D62 opposite the first surface D60. The piston D56, D58 and the rod D52, D54 define a passage D64, D66 (illustrated in FIGS. 7, and 11-13) between the piston D56, D58 and the rod D52, D54, the passage D64, D66 extending from the first surface D60 of the piston D56, D58 to the second surface D62 of the piston D56, D58.

The vehicle D50 may be any type of passenger or commercial vehicle such as a car, a truck, a sport utility vehicle, a crossover vehicle, a van, a minivan, a taxi, a bus, etc. The vehicle D50 includes a body D68 and a frame. The body D68 and frame may be of a unibody construction. In the unibody construction, the body D68, e.g., rockers, serves as the vehicle frame, and the body D68 (including the rockers, pillars, roof rails, etc.) is unitary, i.e., a continuous one-piece unit. As another example, the body D68 and frame may have a body-on-frame construction (also referred to as a cab-on-frame construction). In other words, the body D68 and frame are separate components, i.e., are modular, and the body D68 is supported on and affixed to the frame. Alternatively, the body D68 and frame may have any suitable construction. The body D68 and/or the frame may be formed of any suitable material, for example, steel, aluminum, etc.

The damper assembly D200, D300 controls motion of wheels D70 of the vehicle D50 relative to the body D68 of the vehicle D50. The damper assembly D200, D300 provides variable force to resist motion of the wheels D70 relative to the body D68 based on a speed of such motion. The damper assembly D200, D300 defines an axis A1 extending between ends D71 of the damper assembly D200, D300. The damper assembly D200, D300 may be elongated along the axis A1. The terms "axially," "radially," and "circumferentially" used herein are relative to the axis A1 defined by the damper assembly D200, D300.

The damper assembly D200, D300 is movable from a compressed position to an extended position, and vice versa. A distance between the ends D71 of the damper assembly D200, D300 is less in the compressed position than in the extended position. Springs or the like may urge the damper assembly D200, D300 toward the extended position. Force applied to wheels D70 of the vehicle D50, e.g., from bumps, potholes, etc., may urge to damper assembly D200, D300 toward the compressed position.

The damper assembly D200, D300 provides resistance to motion, i.e., resistance to moving toward the compressed position or the extended position, that is variable as a function of a speed of such motion. For example, and with reference to FIGS. 25, 31, 34, 40, a curve DC1 and a curve DC2 illustrate a functional relationship between a speed of movement of the damper assembly D200, D300 and a resistance to such movement.

With reference to FIGS. 2-11, the damper assembly D200, D300 includes a cylinder D72 that defines a chamber D74. The cylinder D72 may be elongated along the axis A1 of the damper assembly D200, D300, i.e., the cylinder D72 may be hollow and tubular. The cylinder D72 may be metal, or any suitable material. The chamber D74 is filled with a fluid, e.g., an incompressible hydraulic fluid.

The rod D52, D54 extends away from, and is movable relative to, the cylinder D72. The rod D52, D54 is elongated along the axis A1 of the damper assembly D200, D300. The rod D52, D54 is moved relative to the cylinder D72 when the damper assembly D200, D300 is moved toward the compressed position or the extended position.

The rod D52, D54 extends out of the chamber D74 of the cylinder D72. For example, the cylinder D72 may define an opening D76 at an end of the cylinder D72, and the rod D52, D54 may extend from within the chamber D74 to outside the chamber D74 through the opening D76 at the end.

Figure 3:
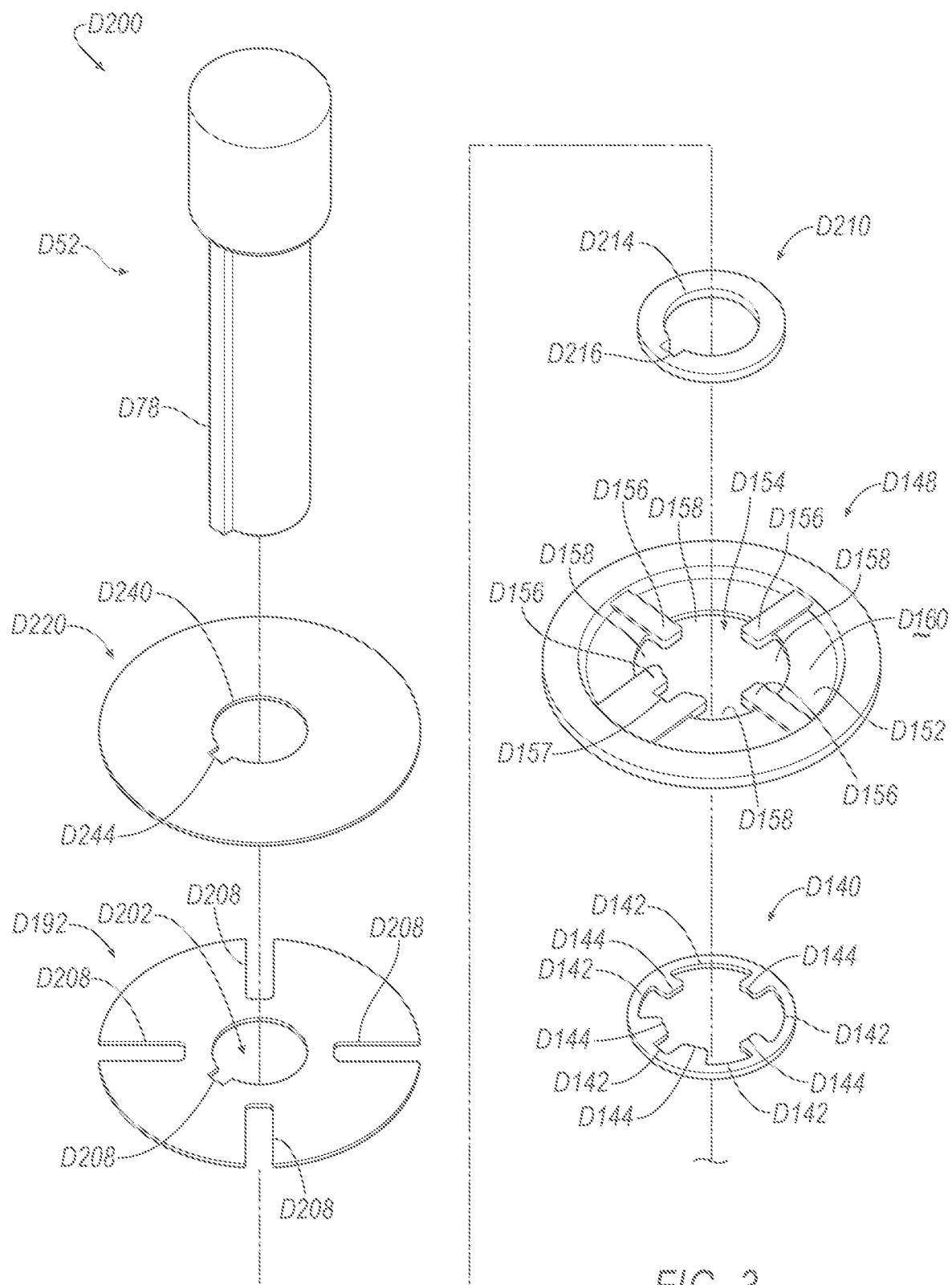
FIG. 3 is an exploded view of components of the damper assembly.
Figure 12:
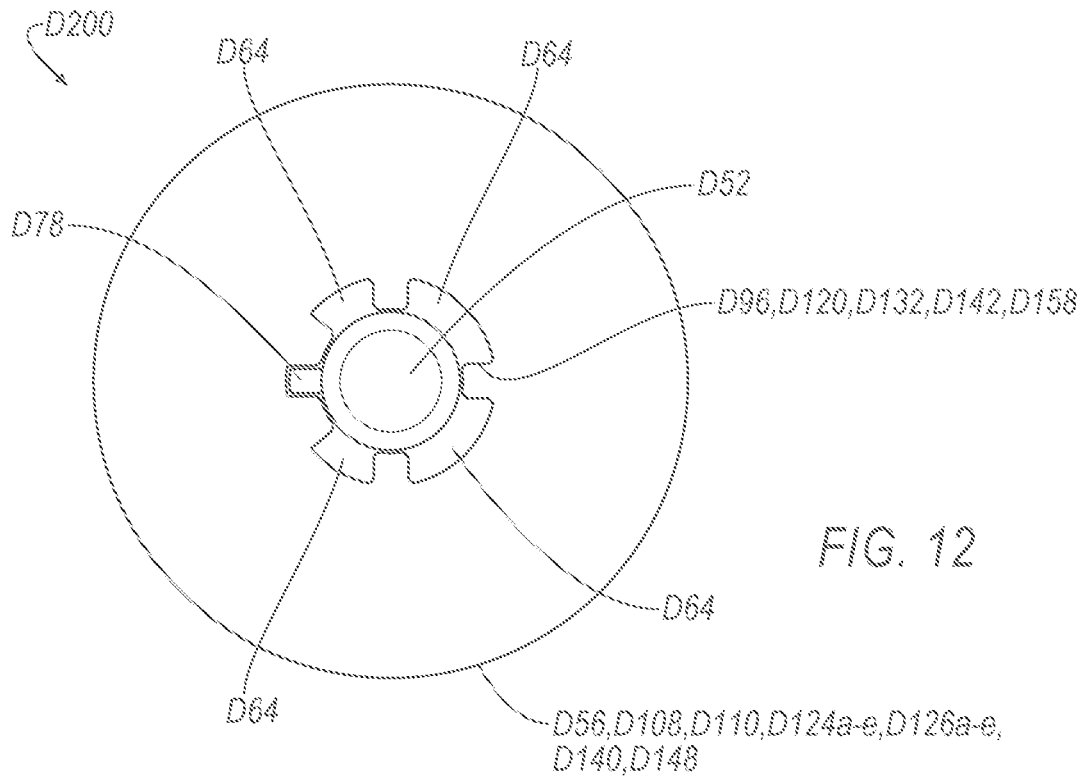
FIG. 12 is an end view of components of the damper assembly of FIGS. 3-6.

With reference to FIGS. 3 and 12, the rod D52 may include a rib D78. The rib D78 may extend radially outward from the axis A1. The rib D78 may be elongated along the axis A1. The rib D78 may enable alignment of notches D96, D120, D132, D142, D158 of the piston D56 and discs D108, D110, D124a-D124e, D126a-D126e, D140, D148 of the damper assembly D200, e.g., to provide the passages D64 (further described below).

Figure 8:
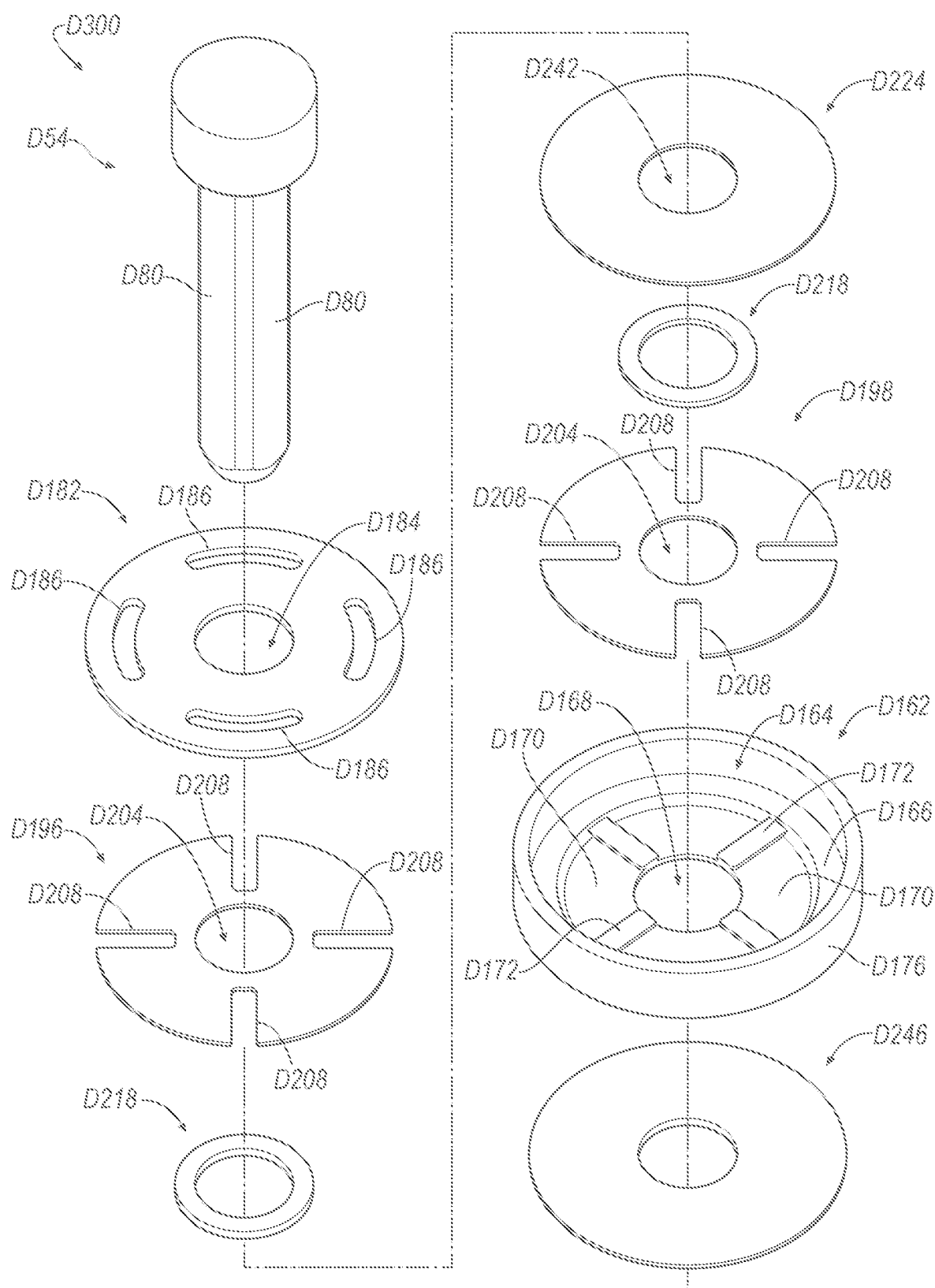
FIG. 8 is an exploded view of components of another damper assembly.
Figure 13:
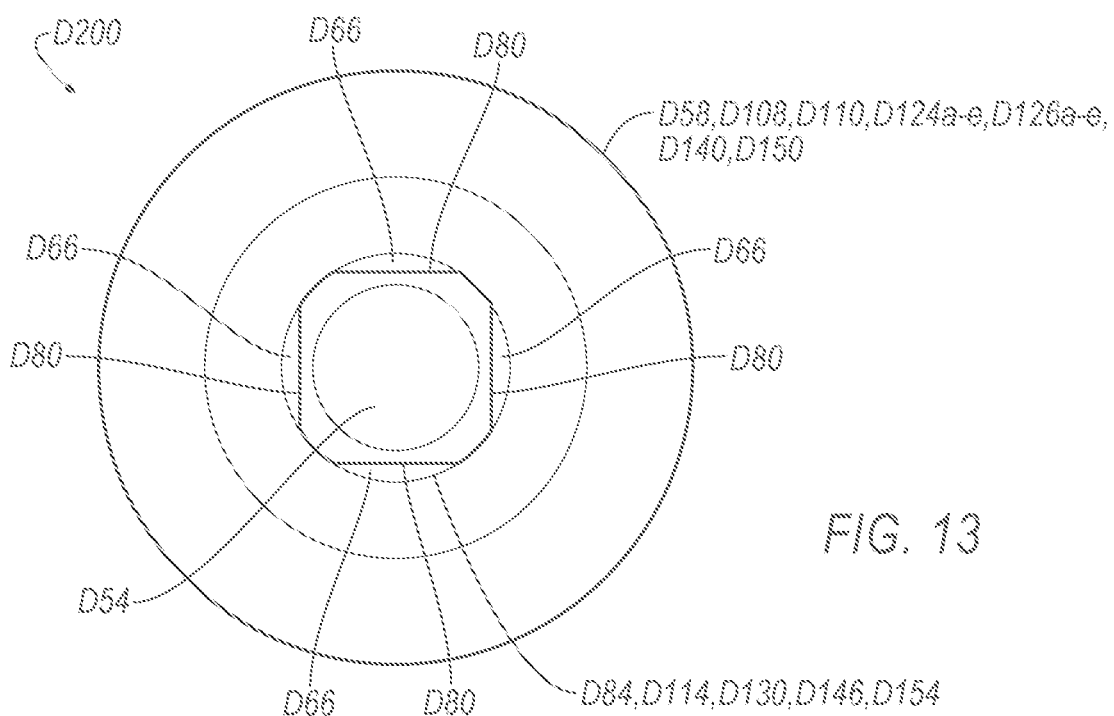
FIG. 13 is an end view of components of the damper assembly of FIGS. 8-10.

With reference to FIGS. 8 and 13, the rod D52, D54 may include one or more flats D80. The flats D80 may be elongated along the axis A1. The flats D80 reduce a size of an outer profile of the rod D54, e.g., to provide the passages D66 between the flats D80 and center openings D84, D114, D130, D146, D154 of the piston D58 and discs D108, D110, D140, D124a-D124e, D126a-D126e, D140, D150 (further described below).

The passages D64, D66 may be interchangeable. In other words, damper assembly D200 may have a rod with flats (as described for rod D54), and center openings of the various components of the damper assembly D200 may be described for the center openings D84, D114, D130, D146, D154. Similarly, the damper assembly D300 may include a rod with a rib, as described for the rod D52, and center openings of the various components of the damper assembly D300 may include notches, e.g., as described for the notches D96, D120, D132, D142, D158.

The piston D56, D58 is slidable within the chamber D74 along the axis A1. The piston D56, D58 is supported by the rod D52, D54, i.e., such that the piston D56, D58 and rod D52, D54 move relative to the cylinder D72 generally in unison. For example, the piston D56, D58 may include a center opening D82, D84. The rod D52, D54 may be in the center opening D82, D84. The piston D56, D58 may be fixed to the rod D52, D54, e.g., via a fastener D86, weld, friction fit, etc. The piston D56, D58 may be metal, plastic, or any suitable material.

The piston D56, D58 divides the chamber D74 into a compression sub-chamber D88 on one side of the piston D56, D58 and a rebound sub-chamber D90 on an opposite side of the piston D56, D58. Movement of the piston D56, D58 within the chamber D74 varies volumes of the compression sub-chamber D88 and the rebound sub-chamber D90. For example, movement of the piston D56, D58 when the damper assembly D200, D300 is moved toward the compressed position decreases a volume of the compression sub-chamber D88 and increases a volume of the rebound sub-chamber D90. As another example, movement of the piston D56, D58 when the damper assembly D200, D300 is moved toward the extended position increases the volume of the compression sub-chamber D88 and decreases the volume of the rebound sub-chamber D90. Varying the volumes of the compression sub-chamber D88 and the rebound sub-chamber D90 generates a pressure differential therebetween and may cause fluid within the chamber D74 to flow from one side of the piston D56, D58 to the opposite side of the piston D56, D58, i.e., from the compression sub-chamber D88 to the rebound sub-chamber D90, or vice versa. The fluid may flow from one side of the piston D56, D58 to the opposite side of the piston D56, D58 via one or more of passages D92, D94 defined by the piston D56, D58 and/or via the passages D64, D66 defined by the piston D56, D58 and the rod D52, D54.

Moving the damper assembly D200, D300 toward the extended position decreases fluid pressure at the first surface D60 and increases fluid pressure at the second surface D62. Moving the damper assembly D200, D300 toward the compressed position increases fluid pressure at the first surface D60 and decreases fluid pressure at the second surface D62. The first surface D60 is between the second surface D62 and the compression sub-chamber D88 of the chamber D74. The second surface D62 is between the first surface D60 and the rebound sub-chamber D90 of the chamber D74. As an example, the first surface D60 may face the compression sub-chamber D88 of the chamber D74 and the second surface D62 may face the rebound sub-chamber D90 of the chamber D74.

The piston D56, D58 defines one or more blow off passages D92, D94, e.g., one or more first blow off passages D92 and one or more second blow off passages D94. The blow off passages D92, D94 extend from the first surface D60 of the piston D56, D58 to the second surface D62 of the piston D56, D58. The blow off passages D92, D94 provide fluid communication between the compression sub-chamber D88 and the rebound sub-chamber D90 of the cylinder D72, i.e., such that fluid may flow from the compression sub-chamber D88 to the rebound sub-chamber D90, or vice versa. The adjectives "first" and "second" are used as identifiers and are not intended to indicate significance or order.

The piston D56, D58 and the rod D52, D54 define the passages D64, D66 therebetween. The passages D64, D66 enable fluid flow from the compression sub-chamber D88 to the rebound sub-chamber D90, and vice versa. The passages D64, D66 may be spaced from each other circumferentially about the axis A1.

Figure 4:
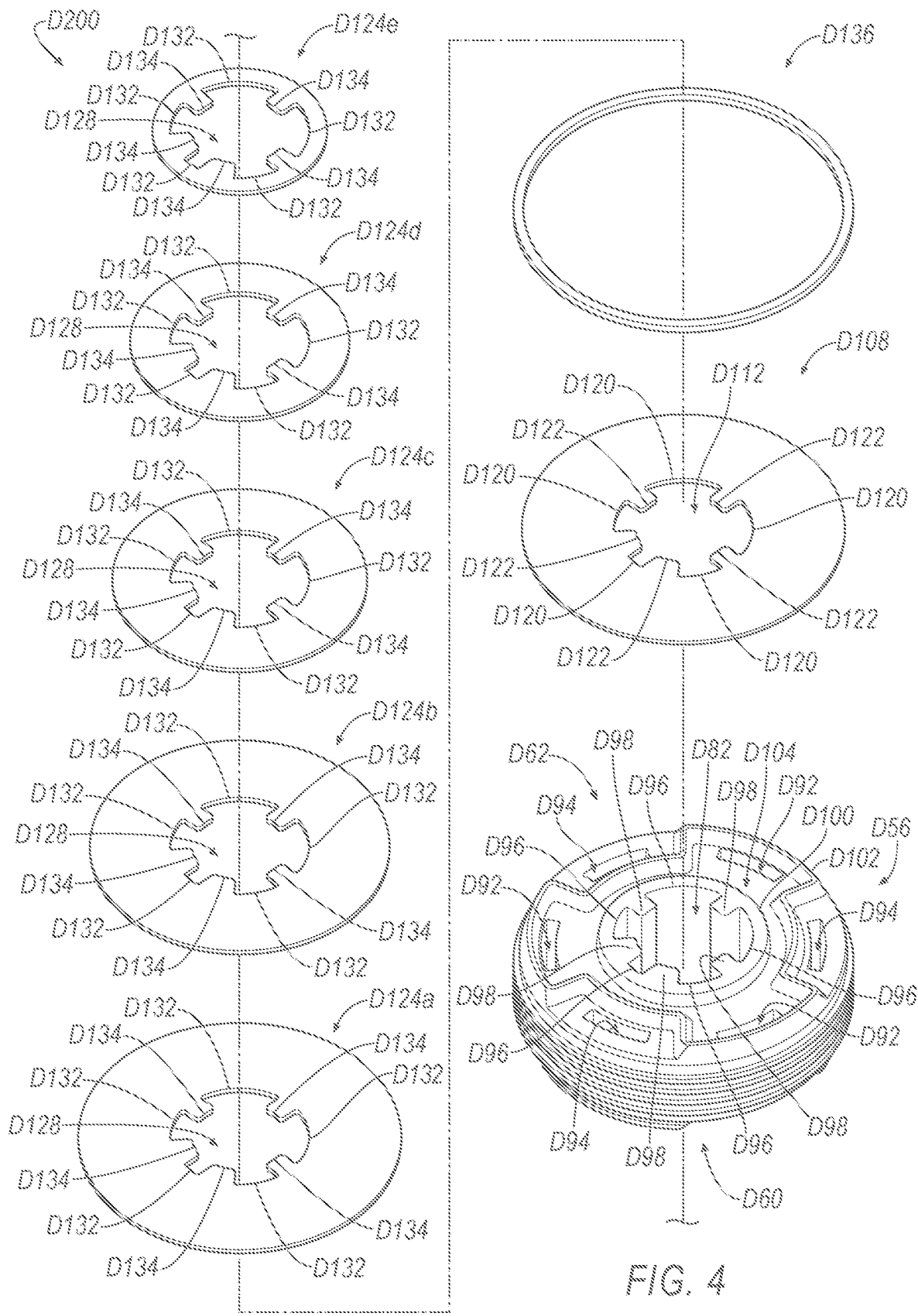
FIG. 4 is a continuation of the exploded view of FIG. 3.

With reference to FIGS. 4 and 12, the piston D56 may define one or more notches D96. The notches D96 may extend radially outward, e.g., away from the center opening D82. The notches extend from the second surface D62 to the first surface D60. The notches may be spaced from each other about the axis A1. For example, the notches D96 may be circumferentially between tabs D98 that extend radially inward. The notches D96 may define the passage D64 between the piston D56 and the rod D52. For example, the passages D64 may extend axially along notches D96 between the tabs D98. The rib D78 of the rod D52 may be in one of the notches D96. The rib D78 in the notch D96 provides a specific orientation between the piston D56 and the rod D52, e.g., such that notches D96 of the piston D56 align with notches D120, D132, D142, D158 of discs D108, D110, D124a-D124e, D126a-D126e, D140, D148 of the damper assembly D200 to define the passages D64.

With reference to FIGS. 8, 9, 11 and 13, the passages D64, D66 may be defined by the flats D80 of the rod D54 and the center opening of the piston D58. For example, each of the passages D66 may extend axially between one of the flats D80 and the center opening D84 of the piston D58.

Returning to FIGS. 4, 7, 9, and 11, the second surface D62 and/or the compressions surface may include ribs D100, D102, e.g., an inner rib D100 and an outer rib D102. The ribs D100, D102 extend along the axis A1. The inner rib D100 is radially inward of the outer rib D102. The inner rib D100 and outer rib D102 may be elongated circumferentially about the axis A1. The inner rib D100 and outer rib D102 may completely surround the axis A1.

The ribs D100, D102 at the second surface D62 may define a first cavity D104, e.g., radially between the inner rib D100 and the outer rib D102. The first cavity D104 may be in fluid communication with the first blow off passages D92 (and not the second blow off passages D94) at the second surface D62. For example, the first blow off passages D92 may be between the inner rib D100 and the outer rib D102 at the second surface D62. The ribs D100, D102 at the first surface D60 may define a second cavity D106, e.g., radially between the inner rib D100 and the outer rib D102. The second cavity D106 may be in fluid communication with the second blow off passages D94 (and not the first blow off passages D92) at the first surface D60. For example, the second blow off passages D94 may be between the inner rib D100 and the outer rib D102 at the first surface D60.

The damper assembly D200, D300 may include one or more blow off discs D108, D110, e.g., a first blow off disc D108 and/or a second blow off disc D110. The blow off discs D108, D110, may be supported by the rod D52, D54. For example, each blow off disc D108, D110 may include a center opening D112, D114 and the rod D52, D54 may be in the center openings D112, D114. The blow off discs D108, D110, decrease a resistance to movement in response to fluid flow past the blow off disc D108, D110, and/or a difference in fluid pressure on one side of the blow off disc 108, D110, relative to an opposite side. The fluid flow and/or difference in fluid pressure may translate or flex the blow off disc D108, D110 to create, and/or increase a size of, an opening D116, D118 (illustrated in FIGS. 33, 35, and 36) through which fluid may flow. Increasing the size of the opening D116, D118 decreases resistance to movement by permitting a greater amount of fluid to flow from one sub-chamber D74 to the other sub-chamber D74. The amount of flex and/or translation of the blow off disc D108, D110, and the resulting increase in size of the opening D116, D118 may be proportional to a rate of fluid flow and/or the pressure difference between the compression sub-chamber D88 and the rebound sub-chamber D90 of the cylinder D72. For example, the greater the rate of fluid flow and/or difference in fluid pressure, the greater the amount of flex and/or translation of the blow off disc D108, D110 away from the piston D56, D58, providing a greater magnitude of increase of the size the opening D116, D118 therebetween. A threshold rate of fluid flow and/or difference in fluid pressure may be required to flex and/or translate the blow off discs D108, D110. The blow off discs D108, D110, may not decrease resistance to movement until the threshold rate of fluid flow and/or difference in fluid pressure is achieved.

With reference to FIGS. 4, 5, 7, and 12 the blow off discs D108, D110 may define one or more notches D120. The notches D120 may extend radially outward, e.g., away from the center openings D112. The notches D120 may be spaced from each other about the axis A1. For example, the notches D120 may be circumferentially between tabs D122 that extend radially inward. The notches D120 may define the passage D64 between the blow off discs D108, D110 and the rod D52. For example, the passages D64 may extend axially along notches D120 between the tabs D122. The rib D78 of the rod D52 may be in one of the notches D120. The rib D78 in the notch D120 provides a specific orientation between the blow off discs D108, D110 and rod D52, e.g., such that notches D120 of the blow off discs D108, D110 align with notches D96, D132, D142, D158 of the piston D56 and discs D124a-D124e, D126a-D126e, D140, D148 to define the passages D64.

Figure 9:
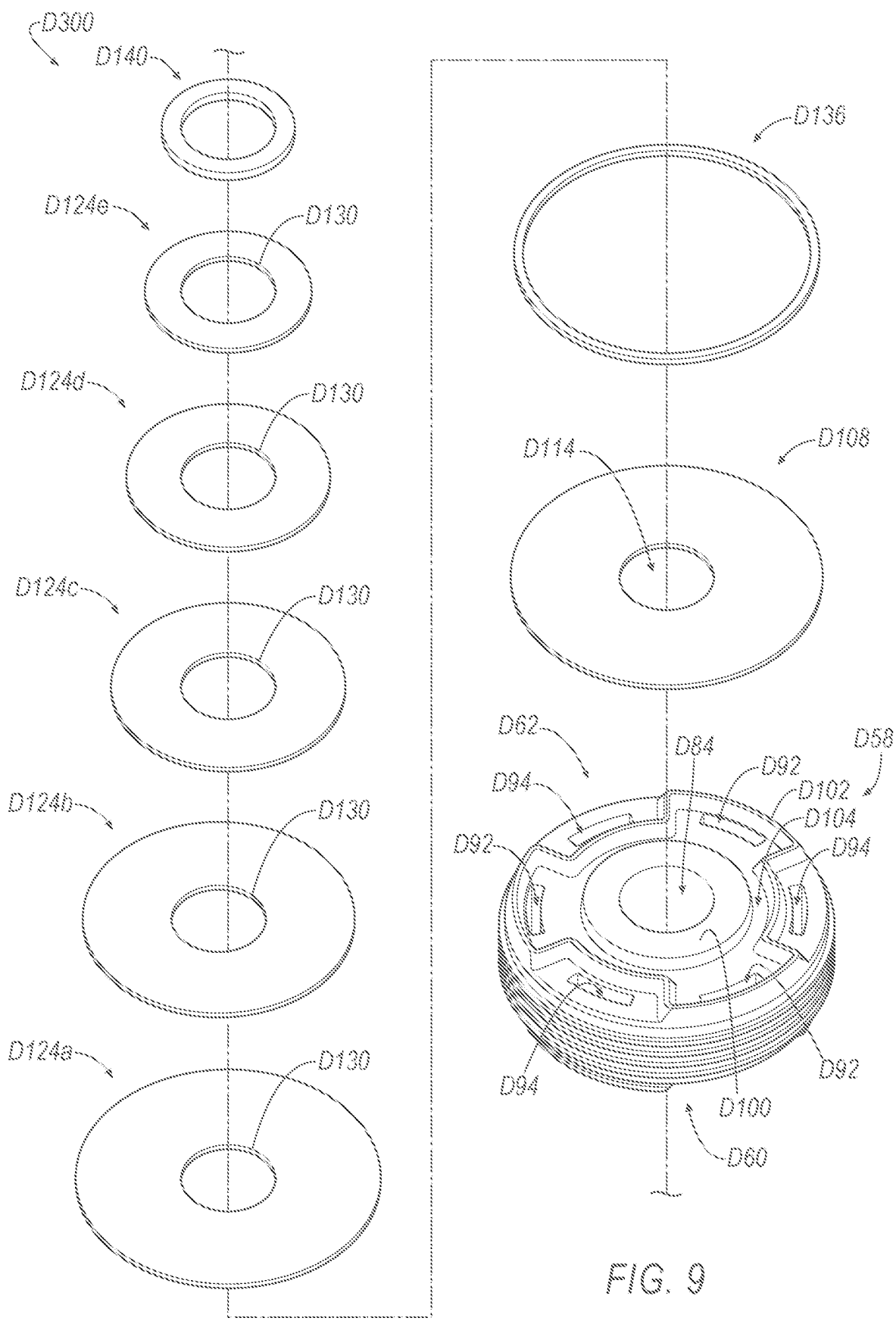
FIG. 9 is a continuation of the exploded view of FIG. 8.
Figure 10:
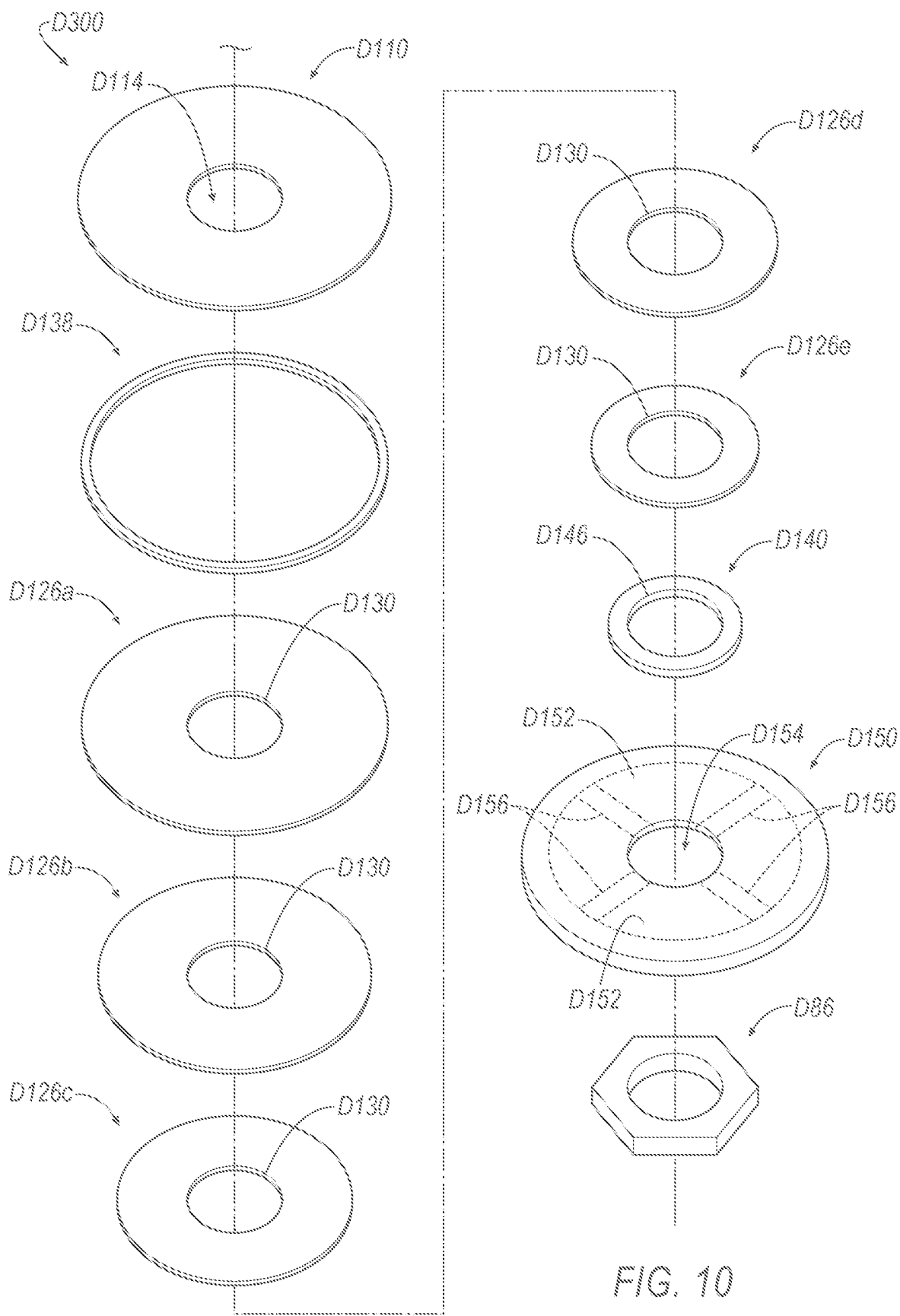
FIG. 10 is a continuation of the exploded view of FIG. 9.
Figure 11:
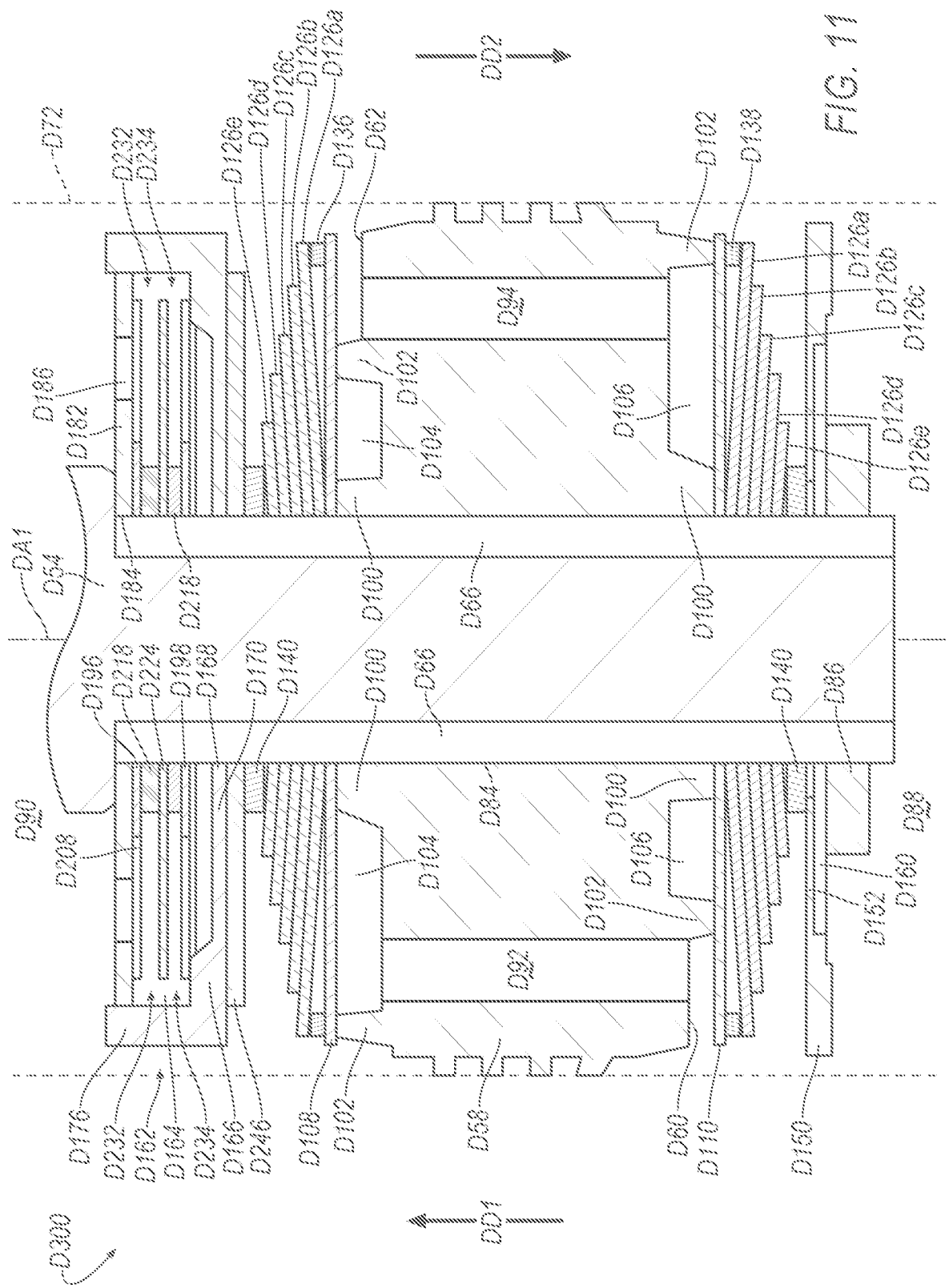
FIG. 11 is a cross-section of a portion of the damper assembly of FIGS. 8-10.

With reference to FIGS. 9, 11 and 13, the passages D66 may be defined by the flats D80 of the rod D52, D54 and the center opening D114 of the blow off discs D108, D110. For example, each of the passages D66 may extend axially between one of the flats D80 and the center opening D114 of the blow off discs D108, D110.

Returning to FIGS. 7 and 11, the first blow off disc D108 may be spaced from the second surface D62 at the second blow off passages D94. Spacing the first blow off disc D108 from the second surface D62 at the second blow off passages D94 permits fluid to freely flow into and out of the second blow off passages D94, e.g., without inhibition of such flow by the first blow off disc D108.

The first blow off disc D108 selectively permits fluid flow out of the first blow off passages D92, i.e., depending on an amount and direction of fluid pressure applied to the first blow off disc D108. For example, the first blow off disc D108 may selectively permit fluid flow through the first blow off passages D92 in a first direction D1. The first blow off disc D108 selectively permits fluid flow by controlling the size of the opening D116 between the first blow off disc D108 and the piston D56, D58.

When the damper assembly D200, D300 is in the neutral state, the first blow off disc D108 covers the first blow off passages D92 at the second surface D62 and restricts or inhibits fluid flow into, and out of, the first blow off passages D92. The first blow off disc D108 in the neutral state may abut the second surface D62 of the piston D56, D58 at the first blow off passages D92, e.g., at distal ends the ribs D100, D102 of the second surface D62.

When the damper assembly D200, D300 is moved toward the compressed position the volume of the compression sub-chamber D88 is reduced and the volume of the rebound sub-chamber D90 is increased, thereby creating a pressure differential where fluid pressure is greater in the compression sub-chamber D88 than in the rebound sub-chamber D90. Such pressure differential, and/or fluid flow caused by such pressure differential, may move the first blow off disc D108 away from the piston D56, D58. Moving the first blow off disc D108 away from the piston D56, D58 creates the opening D116 between the piston D56, D58 and the first blow off disc D108. Fluid may flow out of the first blow off passages D92 through the opening D116 to the rebound sub-chamber D90 of the cylinder D72. The first blow off disc D108 may be moved away from the piston D56, D58 only when the pressure differential is greater than a threshold amount. The threshold amount may be determined based on desired response characteristics of the damper assembly D200, D300, and the first blow off disc D108 and other components of the damper assembly D200, D300 may be designed, e.g., via geometry such as thickness, material type, etc., to flex at the threshold amount.

When the damper assembly D200, D300 is moved toward the extended position the volume of the compression sub-chamber D88 is increased and the volume of the rebound sub-chamber D90 is decreased, thereby creating a pressure differential where fluid pressure is greater in the rebound sub-chamber D90 than in the compression sub-chamber D88. Such pressure differential and/or fluid flow caused by such pressure differential may urge the first blow off disc D108 toward the piston D56, D58 and not create or enlarge the opening D116.

The second blow off disc D110 may be spaced from the first surface D60 at the first blow off passages D92. Spacing the second blow off disc D110 from the first surface D60 at the first blow off passages D92 permits fluid to freely flow into and out of the first blow off passages D92, e.g., without inhibition of such flow by the second blow off disc D110.

The second blow off disc D110 selectively permits fluid flow out of the second blow off passages D94 of the piston D56, D58, i.e., depending on an amount and direction of fluid pressure applied to the second blow off disc D110. For example, the second blow off disc D110 may selectively permit fluid flow through the second blow off passages D94 in a second direction D2 opposite the first direction D1. The second blow off disc D110 selectively permits fluid flow by controlling the size of the opening D118 between the second blow off disc D110 and the piston D56, D58.

When the damper assembly D200, D300 is in the neutral state the second blow off disc D110 covers the second blow off passage D94 at the first surface D60 and restricts or inhibits fluid flow into, and out of, the second blow off passage D94. The second blow off disc D110 in the neutral state may abut the first surface D60 of the piston D56, D58 at the second blow off passage D94, e.g. at distal ends of the ribs D100, D102 at the first surface D60.

When the damper assembly D200, D300 is moved toward the extended position and pressure is greater in the rebound sub-chamber D90 of the cylinder D72 than in the compression sub-chamber D88, the second blow off disc D110 may be moved away from the piston D56, D58 and create the opening D118 between the piston D56, D58 and the second blow off disc D110. Fluid may flow out of the second blow off passage D94 through the opening D118 to the compression sub-chamber D88 of cylinder D72. The second blow off disc D110 may be moved away from the piston D56, D58 only when the pressure differential and/or fluid flow rate is greater than a threshold amount. The threshold amount may be determined based on desired response characteristics of the damper assembly D200, D300, and the second blow off disc D110 and other components of the damper assembly D200, D300 may be designed, e.g., via geometry such as thickness, material type, etc., to flex at the threshold amount.

When the damper assembly D200, D300 is moved toward the compressed position and fluid pressure is greater in the compression sub-chamber D88 of the cylinder D72 than in the rebound sub-chamber D90 the second blow off disc D110 may be urged toward the piston D56, D58, not creating or enlarging the opening between the piston D56, D58 and the second blow off disc D110.

The damper assembly D200, D300 may include one or more spring discs D124a-D124e, D126a-D126e, e.g., one or more first spring discs D124a-D124e and/or one or more second spring discs D126a-D126e. The spring discs D24a-D124e, D126a-D126e may be supported by the rod D52, D54. For example, the rod D52, D54 may extend through center openings D128, D130 of the spring discs D124a-D124e, D126a-D126e. The spring discs D124a-D124e, D126a-D126e are elastically deformable. For example, force applied to an outer edge of the spring discs D124a-D124e, D126a-D126e may cause the spring discs D124a-D124e, D126a-D126e to flex such that the outer edge is moved axially relative the respective center opening D128, D130 of the spring disc D124a-D124e, D126a-D126e. The spring discs D124a-D124e, D126a-D126e are made from an elastically deformable material, e.g., spring steel, plastic having suitable elastic properties, etc.

Figure 5:
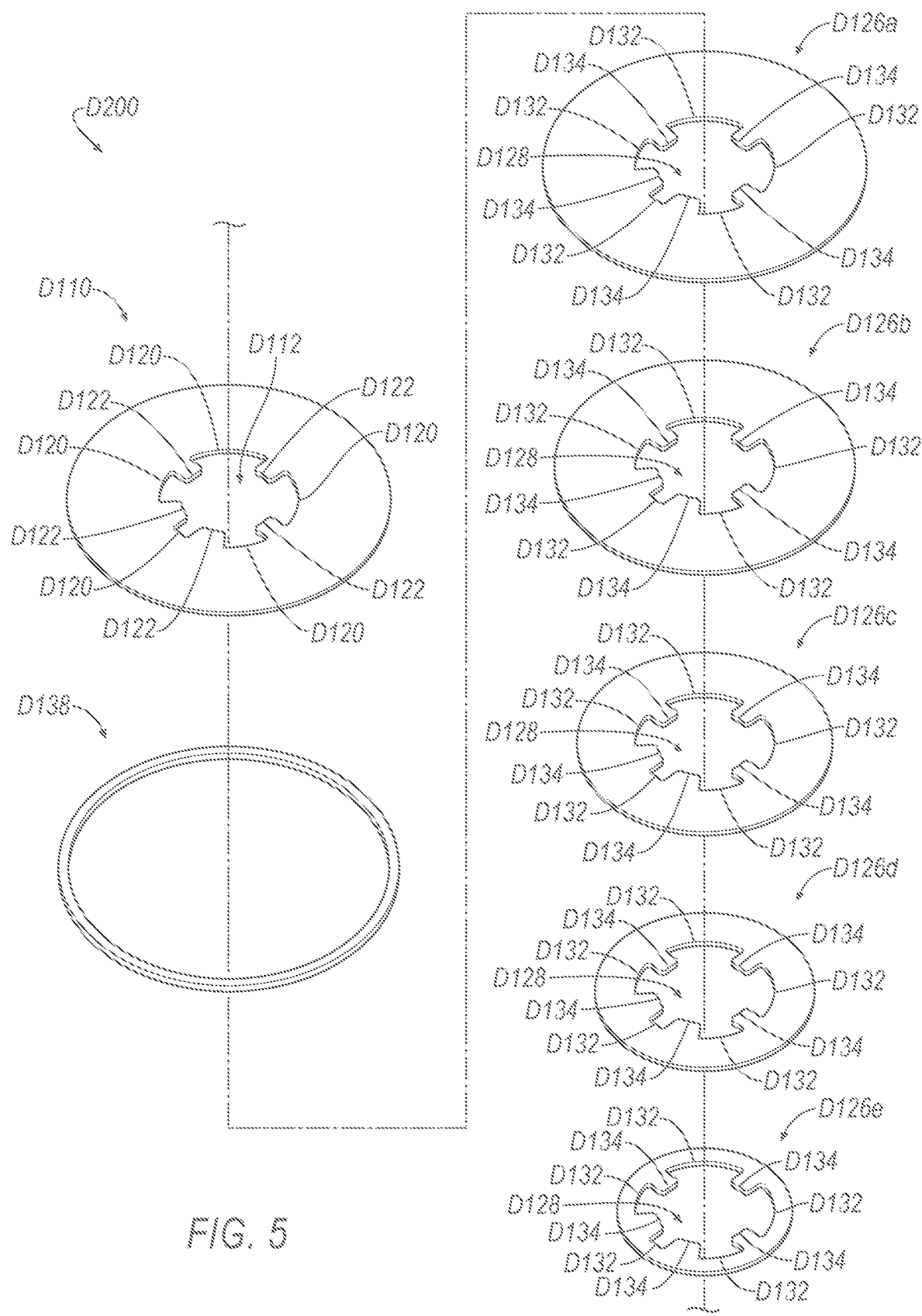
FIG. 5 is a continuation of the exploded view of FIG. 4.
Figure 7:
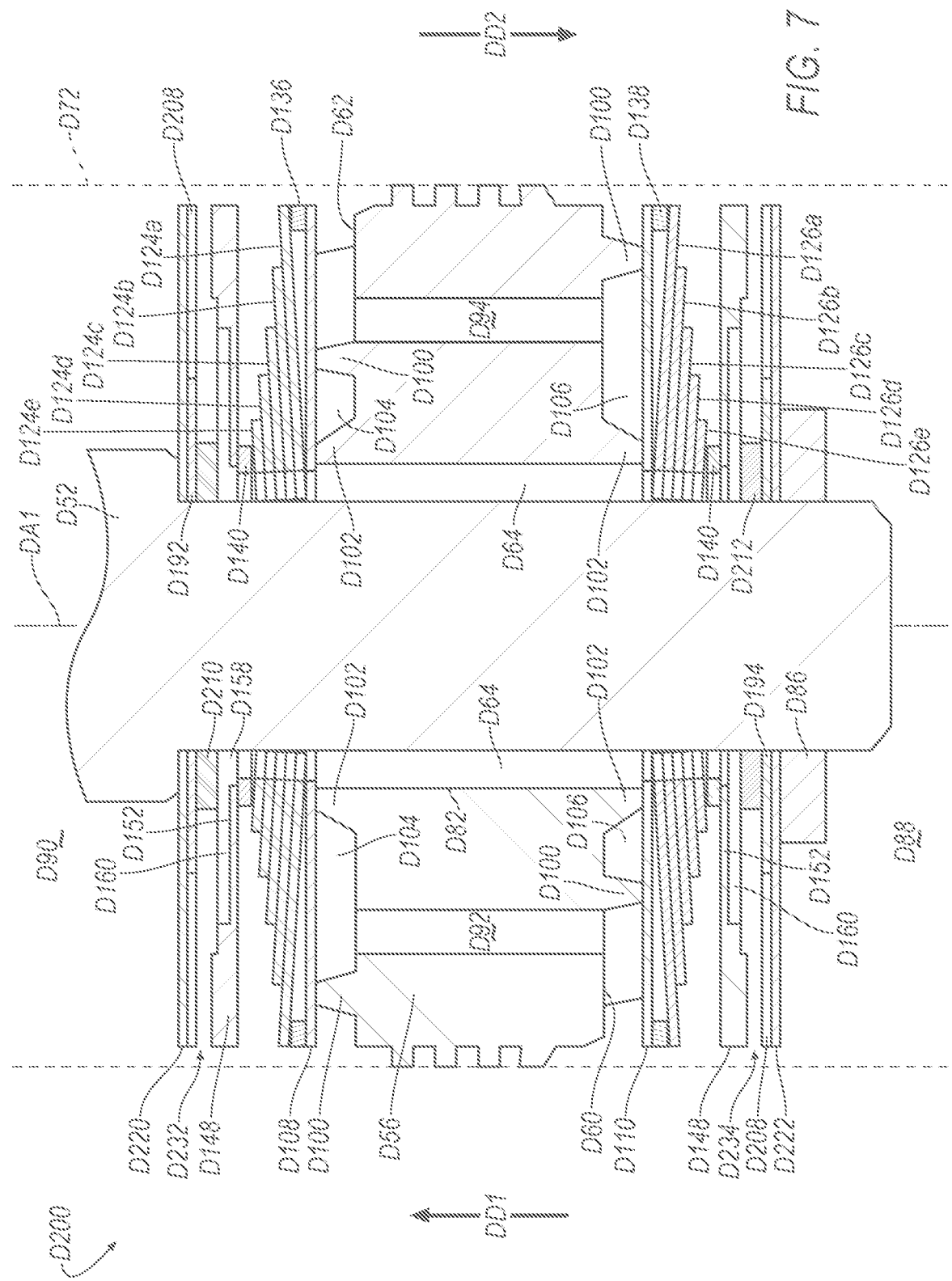
FIG. 7 is a cross-section of a portion of the damper assembly.

With reference to FIGS. 4, 5 and 7, the spring discs D124a-D124e, D126a-D126e may define one or more notches D132 that are circumferentially spaced around the axis A1 between tabs D134, e.g., as described for the notches D96, D120 and tabs D98, D122 of the piston D56 and the blow off disc D108, D110. The notches D96 may define the passage D64 between the spring discs and the rod D52, D54. For example, the passages D64 may extend axially along notches D132 between the tabs D134. The rib D78 of the rod D52 may be in one of the notches D132.

With reference to FIGS. 9-12, the passages D66 may be defined by the flats D80 of the rod D52, D54 and the center openings D130 of the spring discs D124a-D124e, D126a-D126e. For example, each of the passages D66 may extend axially between one of the flats D80 and the center openings D130 of the spring discs D124a-D124e, D126a-D126e.

The first spring discs D124a-D124e urge the first blow off disc D108 toward the piston D56, D58, i.e., the first spring discs D124a-D124e increase an amount of force required to flex the first blow off disc D108 away from the piston D56, D58. The second spring discs D126a-D126e urge the second blow off disc D110 toward the piston D56, D58, i.e., the second spring discs D126a-D126e increase an amount of force required to flex the second blow off disc D110 away from the piston D56, D58.

The spring discs D124a-D124e, D126a-D126e may progressively decrease in size as a function of the distance from the piston D56, D58 along the axis A1. For example, the first spring disc D124a closest to the piston D56, D58 may have a larger outer diameter than an outer diameter of the first spring disc D124b adjacent such first spring disc D124a, and so on. The first spring disc farthest D124e from the piston D56, D58 may have a diameter smaller that diameters of the other first spring discs D124a-D124d. As another example, the spring discs D124a-D124e, D126a-D126e may be configured similar to a leaf spring.

The first spring disc D124a closest the piston D56, D58 may abut the first blow off disc D108 proximate the rod D52, D54. The second spring disc D126a closest the piston D56, D58 may abut the second blow off disc D110 proximate the rod D52, D54.

The spring discs D124a, D126a closest the piston D56, D58 may be spaced from the blow off discs D108, D110 at outer edges of the blow off discs D108, D110. For example, a first ring D136 may be between the first spring disc D124a and the first blow off disc D108 along the axis A1. As another example, a second ring D138 may be between the second spring disc and the second blow off disc D110. The rings D136, D138 may be circular or any suitable shape. The rings D136, D138 may be metal, plastic, or any suitable material. The rings D136, D138 provide internal preload forces to the spring discs D124a-D124e, D126a-D126e. The rings D136, D138 may be radially outward of the passages D64, D66.

Each damper assembly D200, D300 may include a pair of fulcrum discs D140. The fulcrum discs D140 provide fulcrum points for the spring discs D124a-D124e, D126a-D126e. For example, one of the fulcrum discs D140 may abut the smallest first spring disc D124e opposite the adjacent larger first spring disc D124d. Such fulcrum disc D140 may have a smaller outer diameter than the abutting smallest first spring disc D124e. As another example, the other fulcrum disc D140 may abut the smallest second spring disc D156e opposite the adjacent larger second spring disc D126d. Such fulcrum disc D140 may have a smaller outer diameter than the smallest second spring disc D126e.

With reference to FIGS. 3, 6, 7 and 12, the fulcrum discs D140 may define one or more notches D142 spaced from each other about the axis A1, e.g., circumferentially between tabs D144. The notches D142 may define the passage D64 between the fulcrum discs D140 and the rod D52, e.g., the passages D64, D66 may extend axially along notches D142 between the tabs D144. The rib D78 of the rod D52 may be in one of the notches D142. The rib D78 in the notch D142 provides a specific orientation between the fulcrum discs D140 and rod D52, e.g., such that notches D142 of the fulcrum discs D140 align with notches D96, D120, D132, D158 of the piston D56 and discs D108, D110, D124a-D124e, D126a-D126e, D148 to define the passages D64.

With reference to FIGS. 9-12, the passages D66 may be defined by the flats D80 of the rod D54 and center openings D146 of the fulcrum discs D140. For example, each of the passages D66 may extend axially between one of the flats D80 and the center openings D146 of the fulcrum discs D140.

With reference to FIGS. 3, 6, 7, and 10-13, the damper assembly D200, D300 may include or more flow disc D148, D150. The flow discs D148, D150 may each include a recessed area D152. The recessed area D152 may by thinner, e.g., along the axis A1, than an area of the flow disc D148, D150 radially outward of the recessed area D152. The recessed area D152 may surround a center opening D154 of the flow disc D148, D150.

Figure 6:
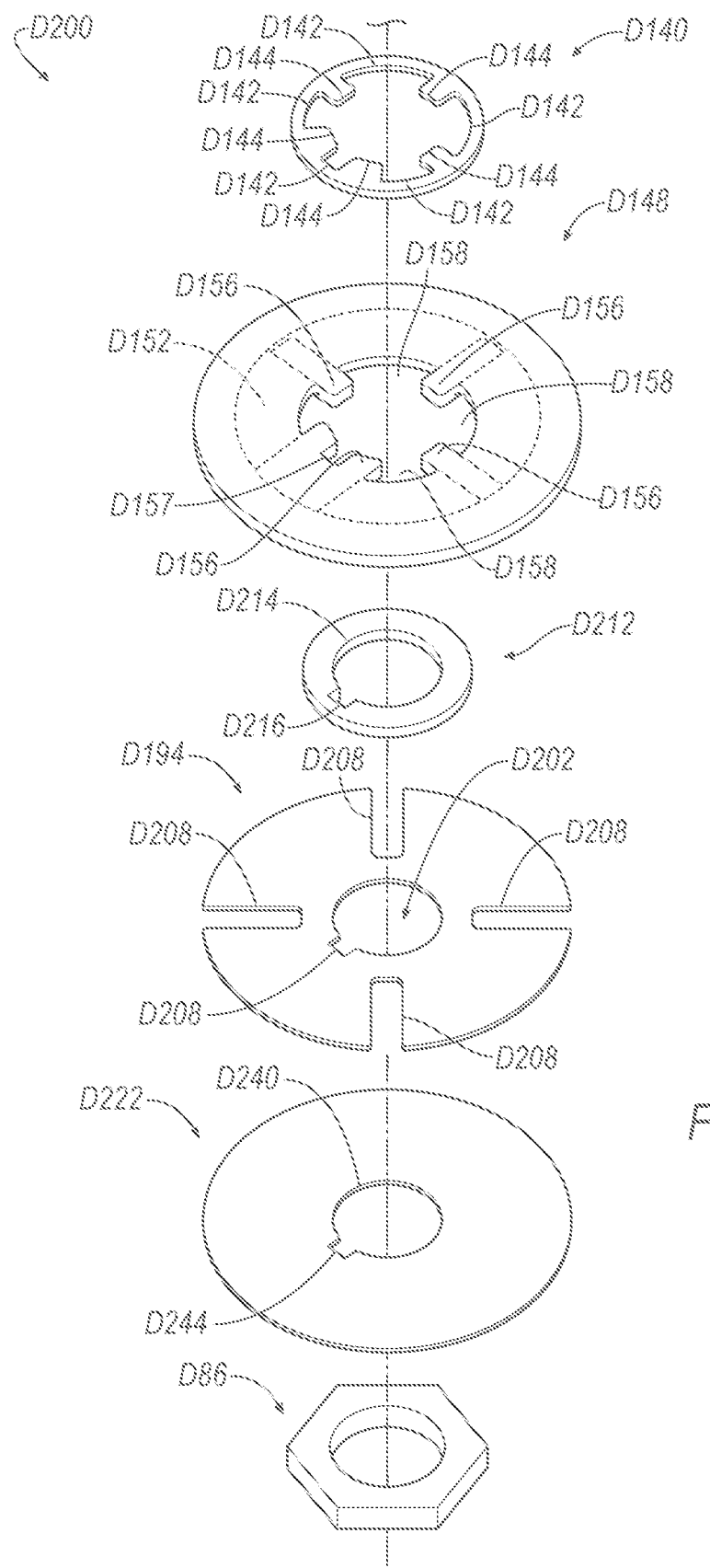
FIG. 6 is a continuation of the exploded view of FIG. 5.

The flow disc D148, D150 may include extensions D156. The extensions may extend along the axis A1 away from the recessed area D152. The extensions D156 may be radially elongated, e.g., to distal ends. The extensions D156 may be thicker along the axis A1 than the recessed area D152. The extensions D156 may be spaced about the axis A1. The extensions D156 may define slots D158 therebetween. With reference to FIGS. 3 and 6, the one of the extensions D156 of the flow disc D148 may define a notch D157, e.g., between tabs. The rib D78 of the rod D52 may be in the notch D157. The extensions D156 may define slots D158 therebetween.

The flow disc D148, D150 is supported by the rod D52, D54. For example, the rod D52, D54 may be in the center opening D154. The extensions D156 of the flow disc D148, D150 may abut the rod D52, D54.

A pair of the flow discs D148 may be supported by the rod D52, D54, e.g., on opposite sides of the piston D56, D58, as illustrated in FIG. 7. The damper assembly D200, D300 may include only a single flow disc D150, e.g., at the first surface D60 and as illustrated in FIG. 11.

The flow disc D148, D150 enables fluid flow into and out of the passages D64, D66, e.g., to and from the compression sub-chamber D88. For example, the flow disc D148, D150 may define a radial passage D160 in fluid communication with the passage D64, D66. The radial passage D160 be defined radially along the recessed area D152 and between the extensions D156. Fluid may flow along the radial passage D160 to the passage D64, D66 via the slots D158. The flow discs D148, D150 may face the respective sub-chamber D74. For example, the flow disc D148 at the second surface D62 may face the rebound sub-chamber D90 and the flow disc D148, D150 at the first surface D60 may face the compression sub-chamber D88.

With reference to FIGS. 8, 11, and 14-19, the damper assembly D300 may include a housing D162, D262, D362, D462 defining a chamber D164. The housing D162, D262, D362, D462 may include a bottom wall D166. The bottom wall D166 may extend radially away from a center opening D168 and circumferentially about the axis A1. The bottom wall D166 may include a recessed area D170. The housing D162, D262, D362, D462 may include extensions D172. The extensions D172 may extend radially inward. The extensions D172 may be circumferentially spaced from each other about the axis A1 and define slots D174 therebetween. The housing D162, D262, D362, D462 may include an outer wall D176. The outer wall D176 may extend along the axis A1, e.g., from the bottom wall D166. The outer wall D176 may extend about the axis A1. The outer wall D176 may completely surround the axis A1. The outer wall D176 and the bottom wall D166 may be monolithic, i.e., a one-piece unit without any fasteners, joints, welding, adhesives, etc., fixing the outer wall D176 and the bottom wall D166 to each other.

The housing D162 and components therein may be replaced with one of the other housings D262, D362, D462. In other words, any of the housings D162, D262, D362, D462 may included in the damper assembly D300. The housing D162 is illustrated at the rebound sub-chamber D90 and the flow disc D150 at the compression sub-chamber D88. Alternatively, the housing D162 may be at the compression sub-chamber D88 and the flow disc D150 at the rebound sub-chamber D90.

The housing D262, D362 may include a restriction rib D178, illustrated in FIGS. 14-17. The restriction rib D178 may extend away from bottom wall D166 of the housing D262, D362, e.g., along the axis A1 and toward a check disc D224, D228, D230. The restriction rib D178 may extend circumferentially about the axis A1. The restriction rib D178 may surround the axis A1. The restriction rib D178 may be radially between the outer wall D176 and the center opening D168. The restriction rib D178 may be radially between the outer wall D176 and the recessed area D170.

Figure 14:
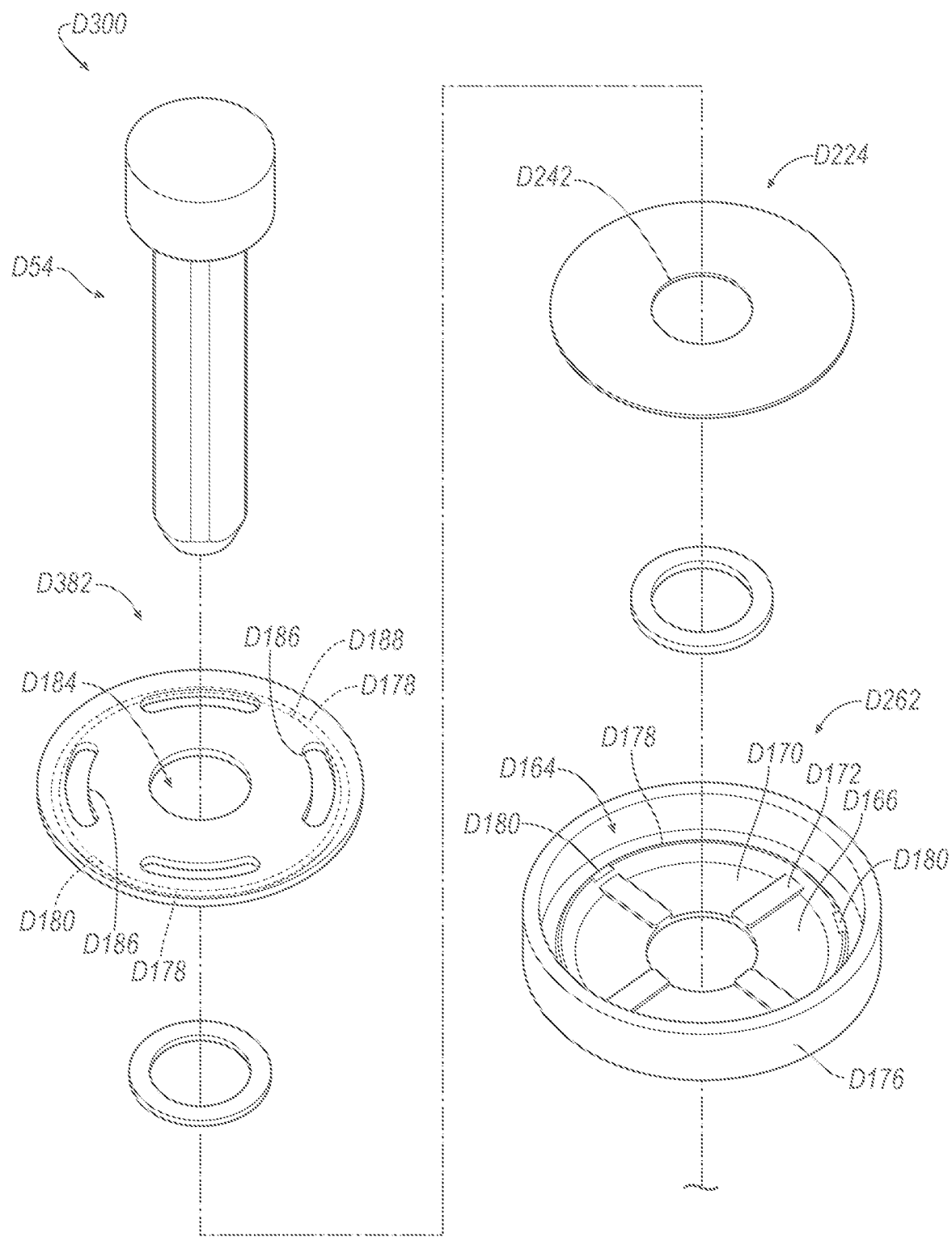
FIG. 14 is an exploded view of a portion of the damper assembly with alternate components.
Figure 15:
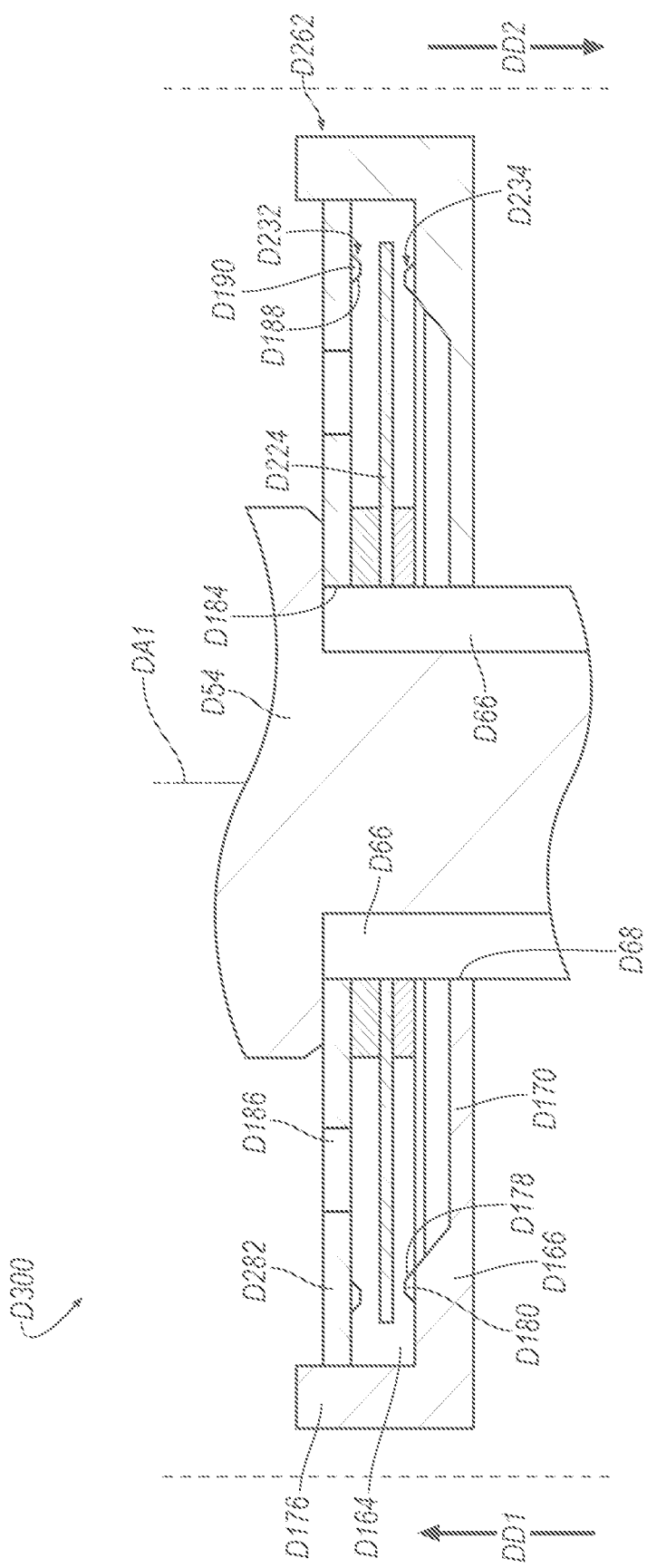
FIG. 15 is a cross section of the portion the damper assembly with alternate components of FIG. 14.
Figure 16:
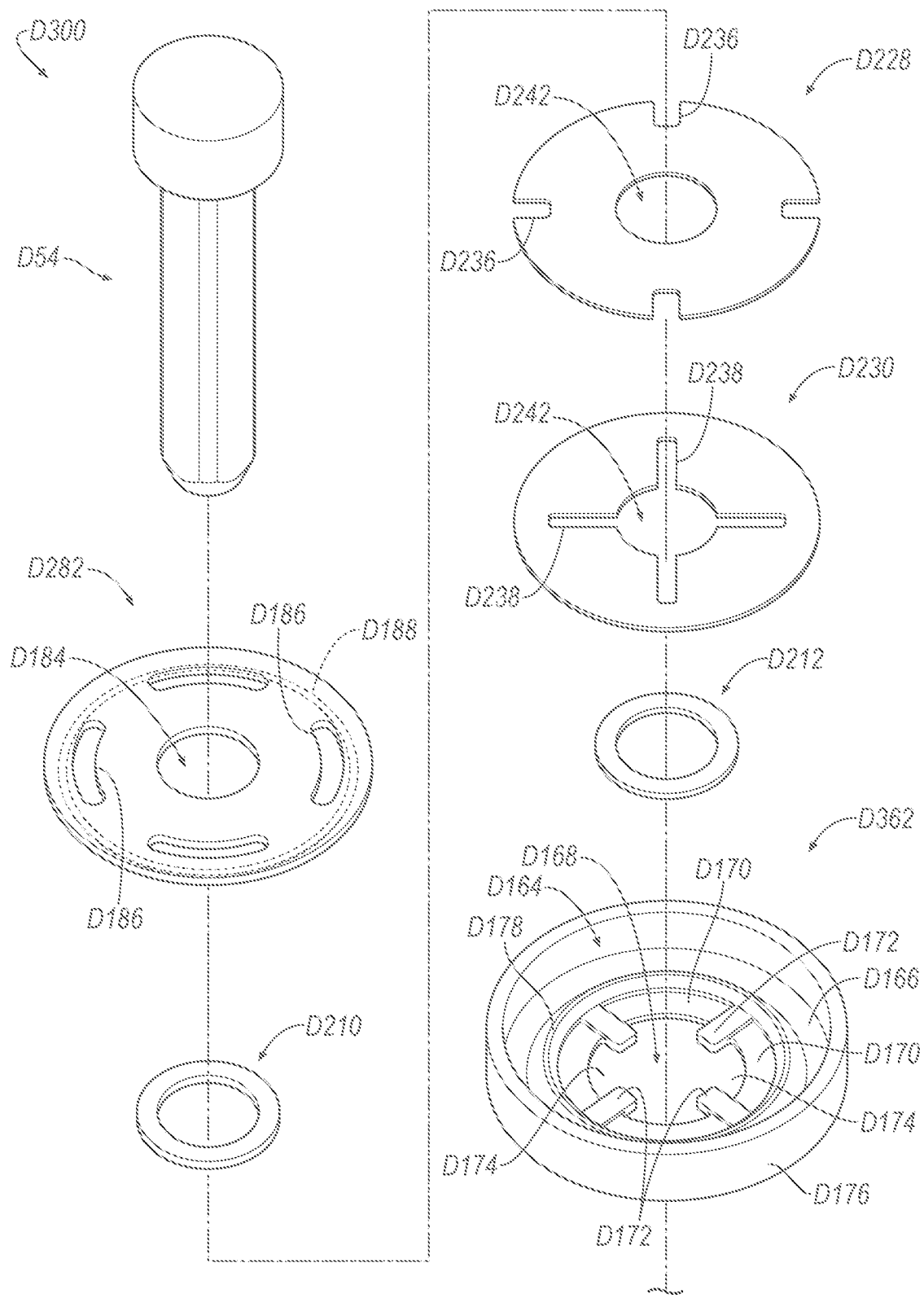
FIG. 16 is an exploded view of a portion of the damper assembly with alternate components.

The restriction rib D178 may include one or more channels D180, illustrated in FIGS. 14 and 15. The channels D180 extend radially through the restriction rib D178. The channels D180 enable fluid flow from one side of the restriction rib D178 to an opposite side of the restriction rib D178.

Returning to FIGS. 8, 11, and 14-19, the housing D162, D262, D362, D462 may be supported by the rod D54. For example, the rod D54 may be in the center opening D168 of the bottom wall D166. The extensions D172 may abut the rod D54. The chamber D164 defined by the housing D162, D262, D362, D462 is in fluid communication with the passage D66, e.g., via the slots D174 of the housing D162, D262, D362, D462.

The damper assembly D200, D300 may include a top disc D182, D282, D382, D482 that may further define the chamber D164. The top disc D182, D282, D382, D482 may be supported by the rod D54, e.g., via a center opening D184. The top disc D182, D282, D382, D482 may be fixed to the outer wall D176 of the housing D162, D262, D362, D462, e.g., via weld, etc. The chamber D164 may be between the top disc D182, D282, D382, D482 and the bottom wall D166. The top disc D182, D282, D382, D482 may include one or more openings D186 that permit fluid flow into and out of the chamber D74.

The top disc D282, D382 may include a restriction rib D188, illustrated in FIGS. 14-17. The restriction rib D188 may extend away from top disc D282, D382, e.g., along the axis A1 and toward the bottom wall D176. The restriction rib D188 may extend circumferentially about the axis A1. The restriction rib D188 may surround the axis A1. The restriction rib D188 may be radially between the outer wall D176 of the housing D262, D362 and the openings D186 of the top disc 282, D382.

The restriction rib D188 may include one or more channels D190, illustrated in FIGS. 14 and 15. The channels D190 extend radially through the restriction rib D188. The channels D190 enable fluid flow from one side of the restriction rib D188 to an opposite side of the restriction rib D188.

Returning to FIGS. 3, 6, 7, 8, 11, 18, and 19, the damper assembly D200, D300 may include one or more orifice discs D192, D194, D196, D198. Each orifice disc D192, D194, D196, D198 defines one or more orifices D208. The orifices D208 may be spaced circumferentially around the orifice discs D192, D194, D196, D198. The orifices D208 permit fluid flow axially and/or radially relative to the axis A1 of the damper assembly D200, D300. Each orifice D208 may extend radially inward from outer edges of the respective orifice disc D192, D194, D196, D198, e.g., to the recessed area D152 of the flow disc D148, D150 such that fluid may flow from the orifice D208 to the recessed area D152. The orifice discs D192, D194, D196, D198 may be supported by the rod D52, D54 and/or the piston D56, D58, e.g., via a center opening D202, D204. The center opening D202 may include a notch D206. The rib D78 of the rod D52 may be in the notch D206.

With reference to FIG. 7, a first orifice disc D192 may be spaced from the first flow disc D148, e.g., with a first spacer D210 therebetween. A second orifice disc D194 may be spaced from the second flow disc D150, e.g., with a second spacer D212 therebetween. The spacers D210, D212 may be rings or any suitable shape. The spacers D210, D212 may be supported by the rod D52, e.g., via center openings D214 of the spacers D210, D212. The center openings D214 may include notches D216. The rib D78 of the rod D52 may be in the notch D216.

Figure 19:
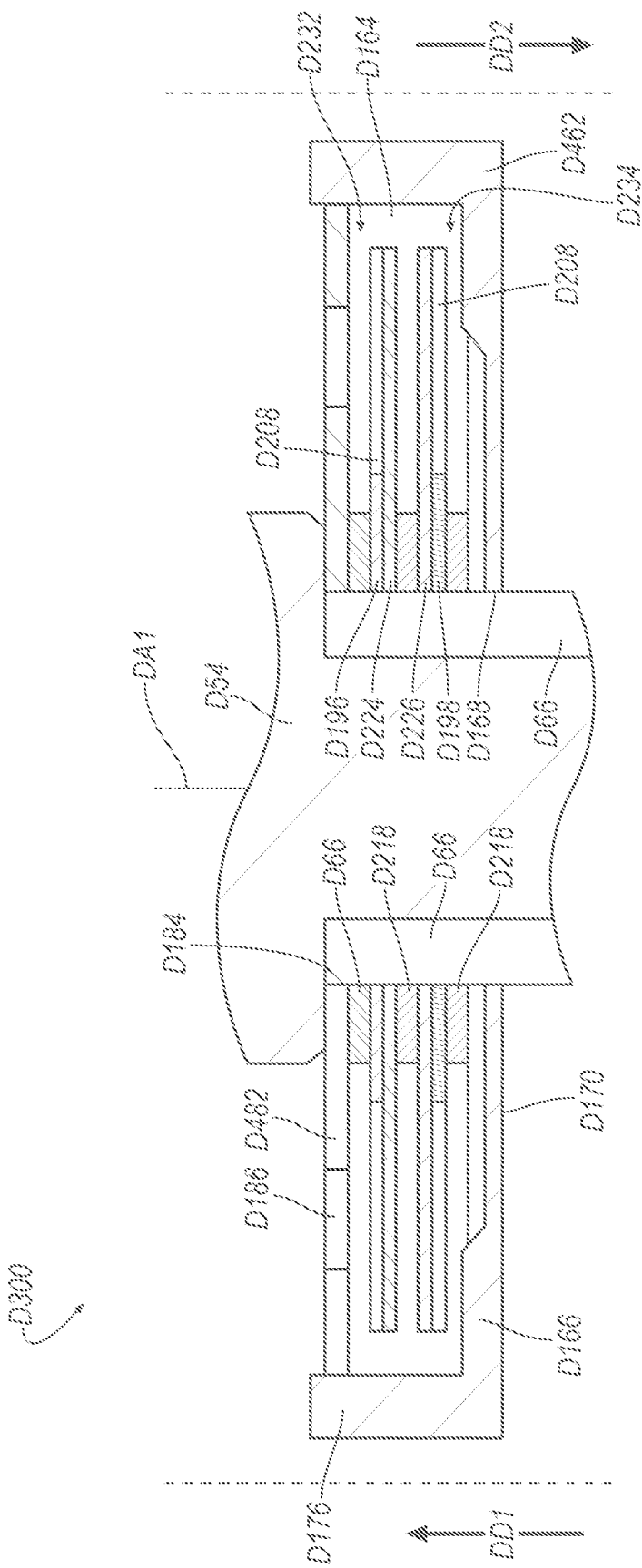
FIG. 19 is a cross section of the portion the damper assembly with alternate components of FIG. 18.

A first orifice disc D196 and a second orifice disc D198 may be in the chamber D74. With reference to FIG. 11, the first orifice disc D196 may abut the top disc D182, and the second orifice disc D198 may abut the bottom wall D166 of the housing D162. Orifices D208 of the first orifice disc D196 may be in fluid communication with the openings D186 of the top disc D182. Orifices D208 of the second orifice disc D198 may be in fluid communication with the slots D174 of the housing D162. With reference to FIG. 19, orifice discs D196, D198 may be spaced from the bottom wall D166 of the housing D462 and the top disc D482, e.g. with spacers D218 therebetween.

Check discs D220, D222, D224, D226, D228, D230, illustrated in FIGS. 3, 6, 7, 8, and 14-65 selectively restrict fluid flow through the passage D64, D66 defined by the rod D52, D54, the piston D56, D58, etc., depending on a direction and an amount of fluid pressure and/or speed of fluid flow applied to the check discs D220, D222, D224, D226, D228, D230. The check discs D220, D222, D224, D226, D228, D230 selectively permit fluid through the passages D64, D66 by controlling a size of openings D232, D234 between the check disc D220, D222, D224, D226, D228, D230 and another component of the damper assembly D200, D300, such as the flow disc D148, D150, the housing D162, D262, D362, D462, the top disc D182, D282, D382, D482, etc.

Check discs D220, D222, D224, D226, D228, D230 increase a resistance to movement in response to fluid flow past the respective check disc D220, D222, D224, D226, D228, D230 and/or a difference in fluid pressure on one side of the check disc D220, D222, D224, D226, D228, D230 relative to an opposite side. The fluid flow and/or difference in fluid pressure may translate or flex the check disc D220, D222, D224, D226, D228, D230 and decease a size of an opening D232, D234 through which fluid may flow and thereby increase resistance to movement. For example, the check discs D220, D222, D224, D226, D228, D230 may be movable from unflexed positions, illustrated in FIGS. 7, 15, 17, and 19, to flexed positions illustrated in FIGS. 26-30. The check discs D220, D222, D224, D226, D228, D230 may be supported by the rod D52, D54, e.g., via a center opening D242 of each of the check discs D220, D222, D224, D226, D228, D230.

The amount of flex and/or translation of the check discs D220, D222, D224, D226, D228, D230 (and the associated decrease in size of the opening D232, D234) may be proportional to a rate of fluid flow and/or a pressure differential between the compression sub-chamber D88 and the rebound sub-chamber D90 of the cylinder D72. For example, the greater the rate of fluid flow and/or difference in fluid pressure, the greater the amount of flex and/or translation of the check disc D220, D222, D224, D226, D228, D230. A threshold rate of fluid flow and/or difference in fluid pressure may be required to flex and/or translate the check discs D220, D222, D224, D226, D228, D230. The check discs D220, D222, D224, D226, D228, D230 may not increase resistance to movement until the threshold rate of fluid flow and/or difference in fluid pressure is achieved.

With reference to FIG. 7, the check discs D220, D222 may be axially outboard of the orifice discs D192, D194. The check discs D220, D222 may abut the orifice discs D192, D194. The first orifice disc D192 may be between the first check disc D220 and the first flow disc D148. The second orifice disc D194 may be between the second check disc D222 and the second flow disc D148. The orifice discs D192, D194 may be spaced from the flow discs D148 when the check discs D220, D222 are in the unflexed positions. The orifice discs D192, D194 may abut the flow disc D148 when the check discs D220, D222 are in the flexed positions, as illustrated in FIGS. 72 and 81.

With reference to FIGS. 11, 21, 17, and 19, the check discs D224, D226, D228, D230 may be in the chamber D164. For example, check discs D224, D226, D228, D230 may be axially between the bottom wall D166 and the top disc D182, D282, D382, D482. The check discs D224, D226, D228, D230 may be spaced from the outer wall D176 of the housing D162, D262, D362, D462, e.g., such that fluid may flow therebetween.

A single check disc D224 in the chamber D164, as illustrated in FIGS. 11 and 15, and may selectively restrict fluid flow through the passage D66 in both the first direction D1 and the second direction D2. The check disc D224 may be between the first orifice disc D196 and the second orifice disc D198, as illustrated in FIG. 11. Such check disc D224 may be spaced from the orifice discs D196, D198, e.g., with spacers D218 therebetween. The check disc D224 may be spaced from the bottom wall D166 and the top disc D182, D382, e.g., with spacers D218 therebetween.

Figure 27:
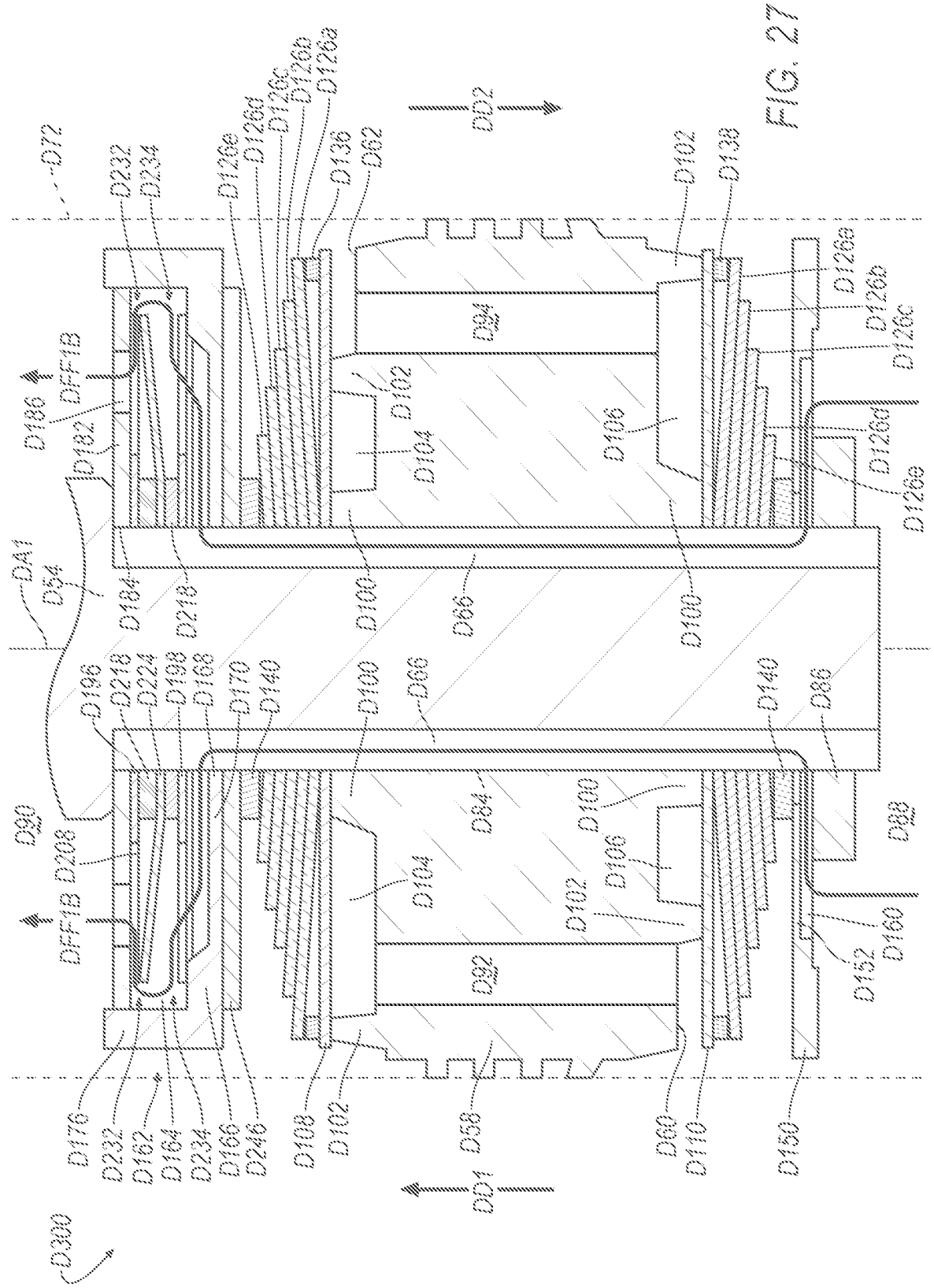
FIG. 27 is the cross section of FIG. 11 and illustrating the first fluid flow path when the damper assembly is moved toward the compressed position with the fluid flow rate and/or pressure differential above the first threshold.
Figure 36:
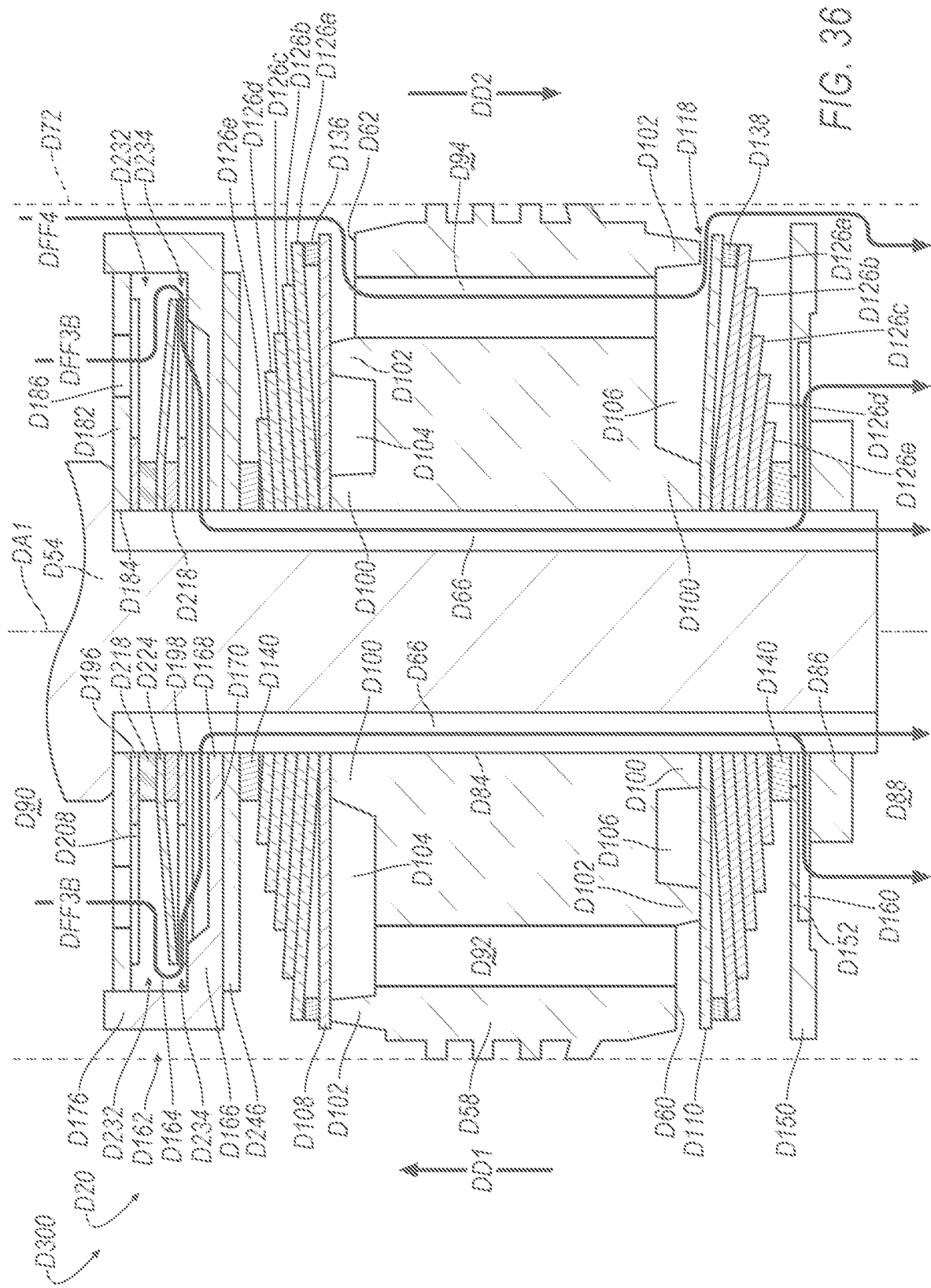
FIG. 36 is the cross section of FIG. 11 and illustrating a third fluid flow path and a fourth fluid flow path when the damper assembly is moved toward the extended position with the fluid flow rate and/or pressure differential above the second threshold.

The check disc D224 in the unflexed position may be spaced from the orifice discs D1196, D198 in the unflexed position and may abut one of the orifice discs D196, D198 in the flexed positions, as illustrated in FIGS. 11, 27, and 36.

Figure 28:
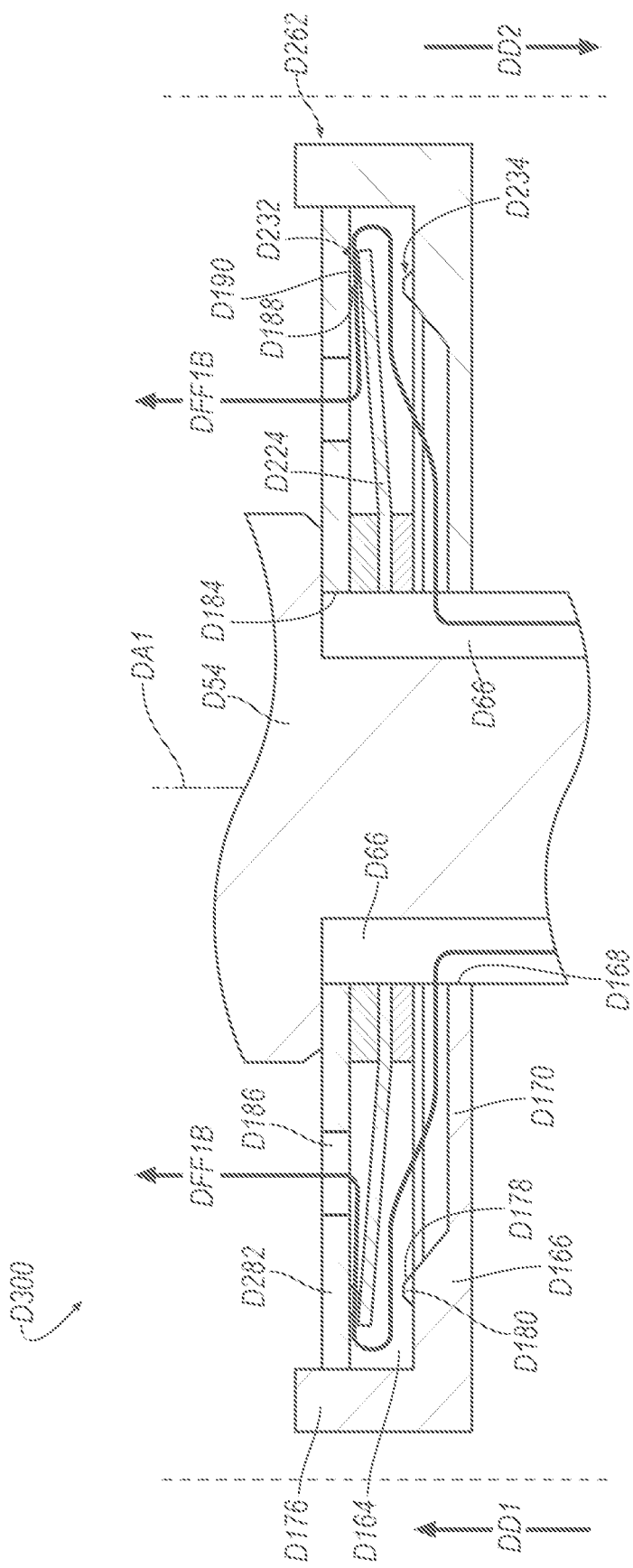
FIG. 28 is the cross section of FIG. 15 and illustrating the first fluid flow path when the damper assembly is moved toward the compressed position with the fluid flow rate and/or pressure differential above the first threshold.
Figure 37:
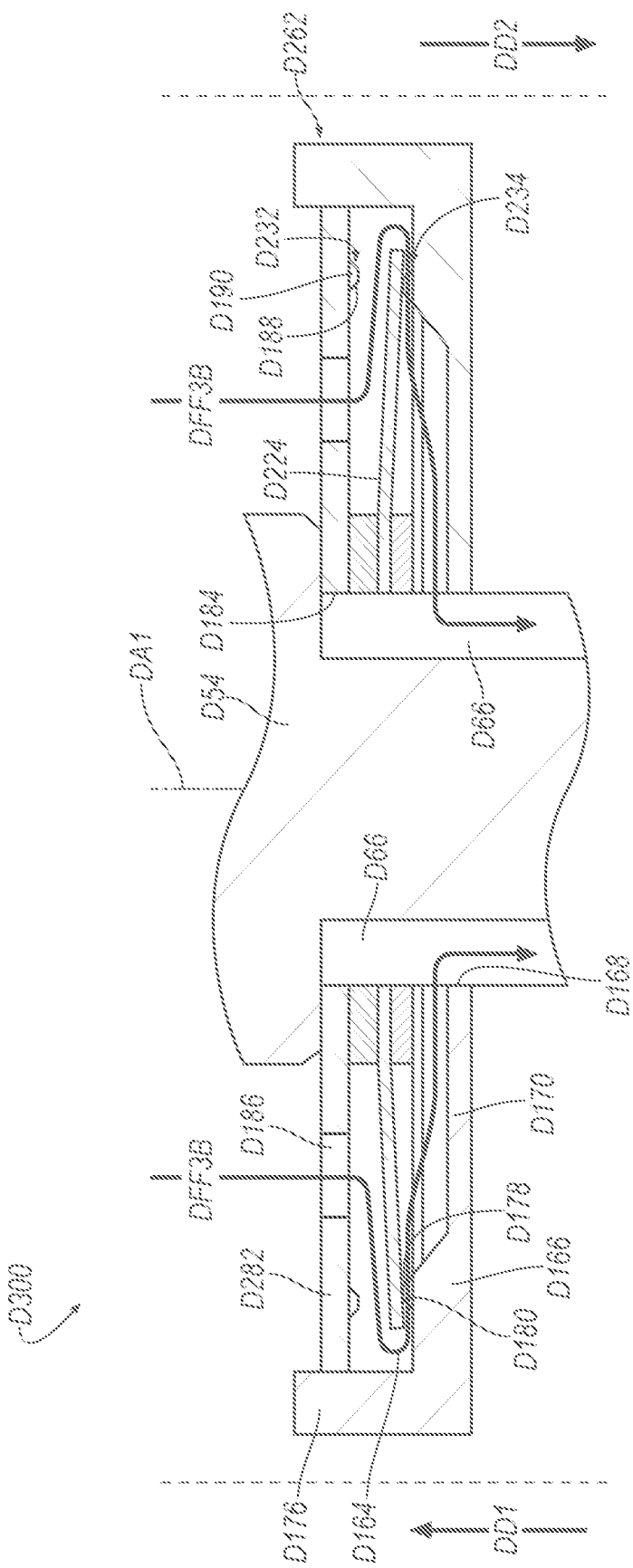
FIG. 37 is the cross section of FIG. 15 and illustrating the third fluid flow path when the damper assembly is moved toward the extended position with the fluid flow rate and/or pressure differential above the first threshold.

The check disc D224 may be spaced from the top disc D282 and the bottom wall D166 of the housing D262 in the unflexed position and may abut one of the top disc D282 or the bottom wall D166 in the flexed positions, as illustrated in FIGS. 15, 28, and 37.

Figure 17:
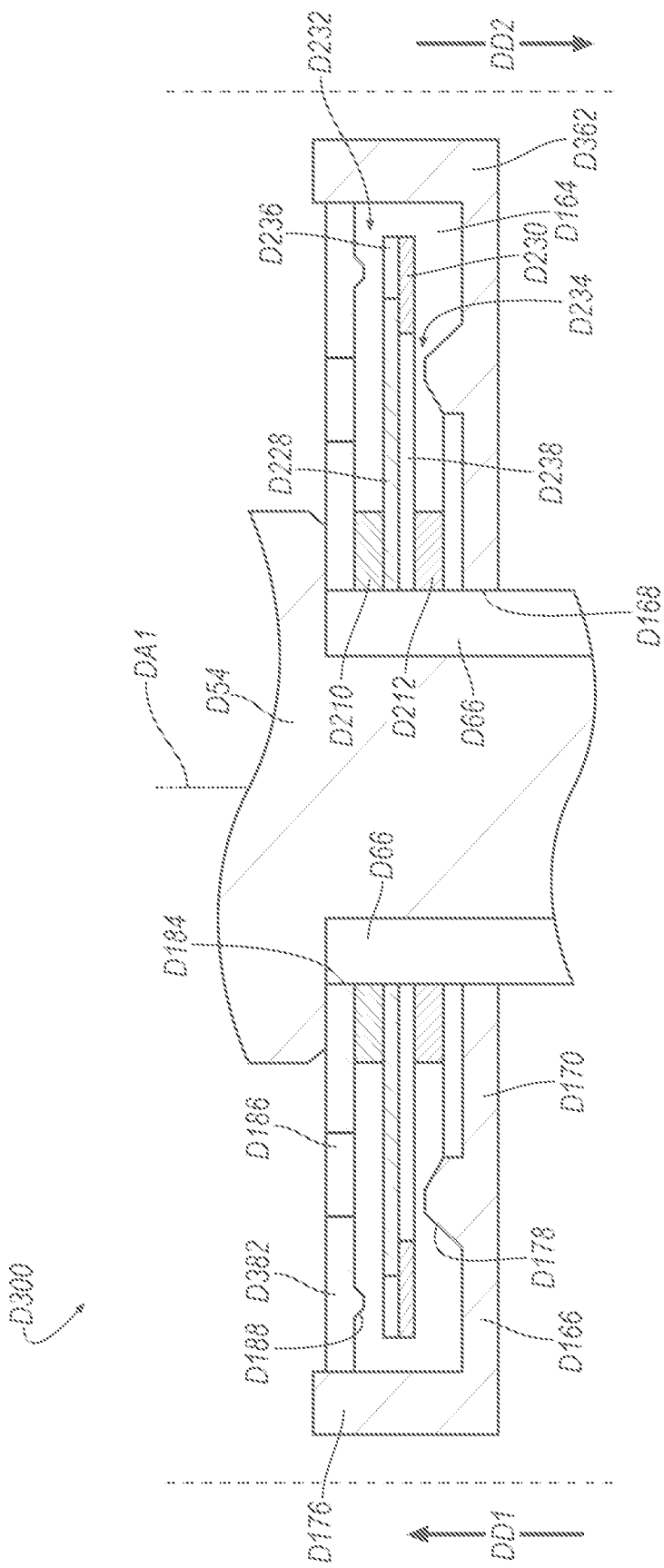
FIG. 17 is a cross section of the portion the damper assembly with alternate components of FIG. 16.
Figure 18:
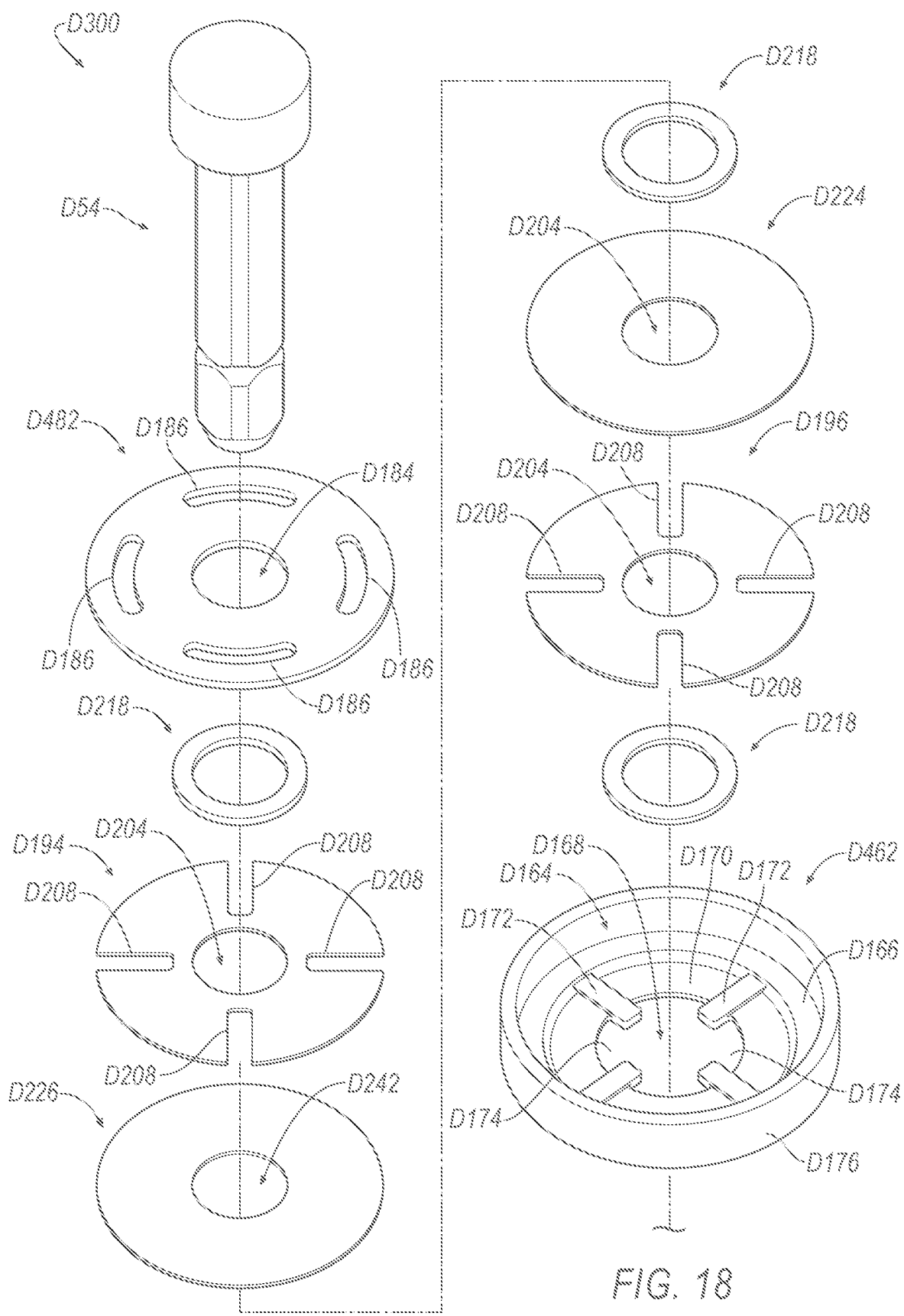
FIG. 18 is an exploded view of a portion of the damper assembly with alternate components.
Figure 29:
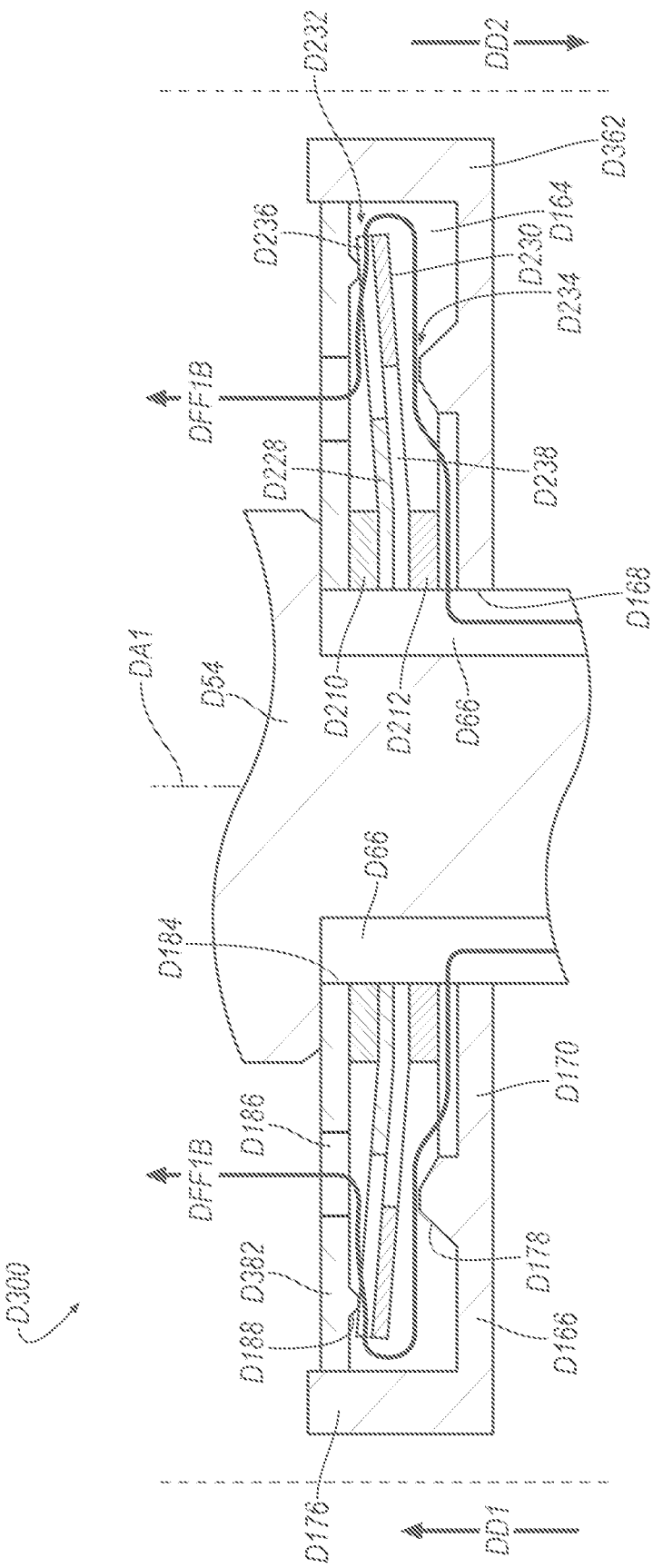
FIG. 29 is the cross section of FIG. 17 and illustrating the first fluid flow path when the damper assembly is moved toward the compressed position with the fluid flow rate and/or pressure differential above the first threshold.
Figure 38:
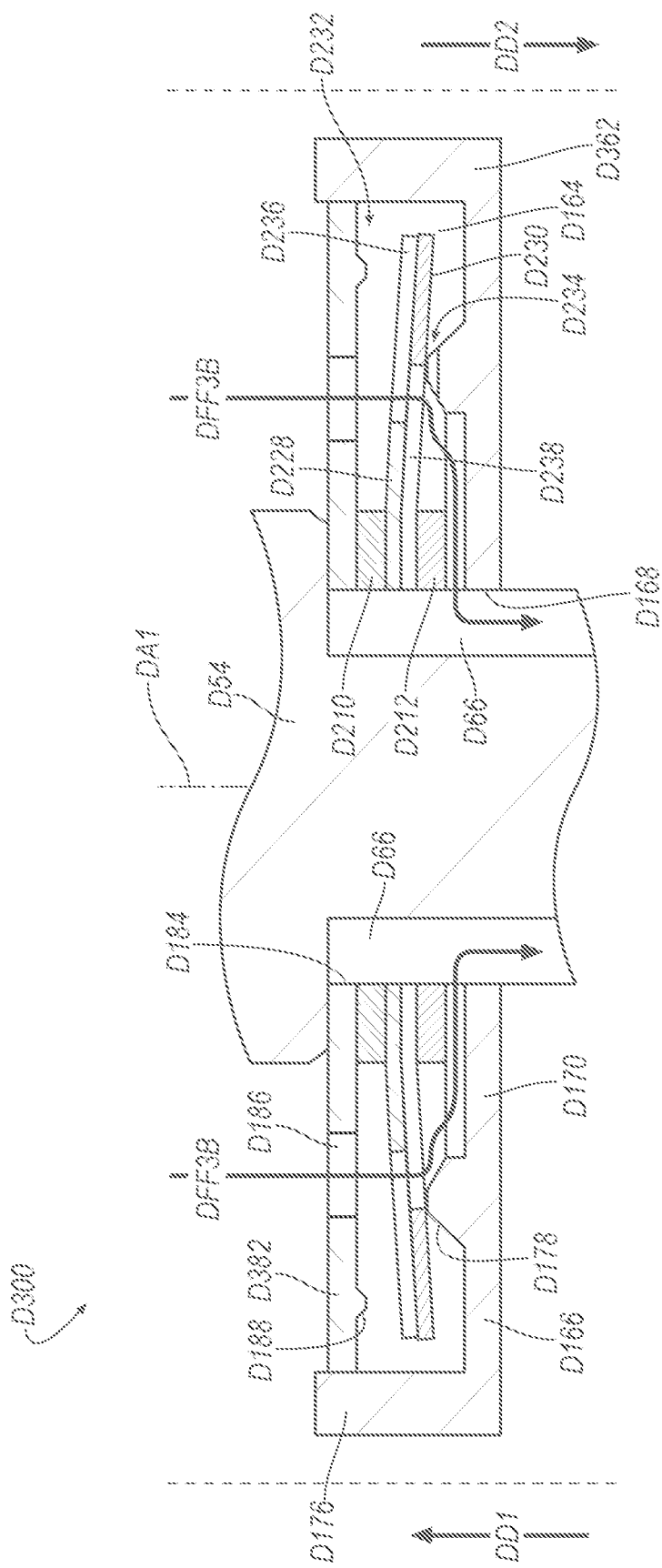
FIG. 38 is the cross section of FIG. 17 and illustrating the third fluid flow path when the damper assembly is moved toward the extended position with the fluid flow rate and/or pressure differential above the first threshold.

The check discs D228, D230 in the unflexed position may be spaced from the top disc D382 and the bottom wall D166 of the housing D362 in the unflexed position, the first check disc D228 may abut the top disc D382 in the flexed position, and the second check disc D230 may abut the bottom wall D166 in the flexed position as illustrated in FIGS. 17, 29, and 38. The first check disc D228 may include orifices D236. The orifices D236 provide radial flow along the disc D228, D230, e.g., past the restriction ribs D178, D188. The orifices D326 may be at the rib D188 of the of the top disc D382, i.e., such that fluid may flow from one side of the rib D188 to another via the orifices D236. The second check disc D230 may include orifices D238. The orifices D238 may be at the rib D178 of the of the bottom wall D166, i.e., such that fluid may flow from one side of the rib D178 to another via the orifices D236.

A pair of check discs D224, D226, D228, D230 may be in the chamber D164, as illustrated in FIGS. 17 and 19. The check discs D228, D230 may abut each other, as illustrated in FIG. 17. The check discs D224, D226 may be spaced from each other, e.g., with a spacer D218 there between and as illustrated in FIG. 19. The check discs D224, D226 may be between and abut the orifice discs D192, D194, D196, D198, also illustrated in FIG. 19.

Figure 30:
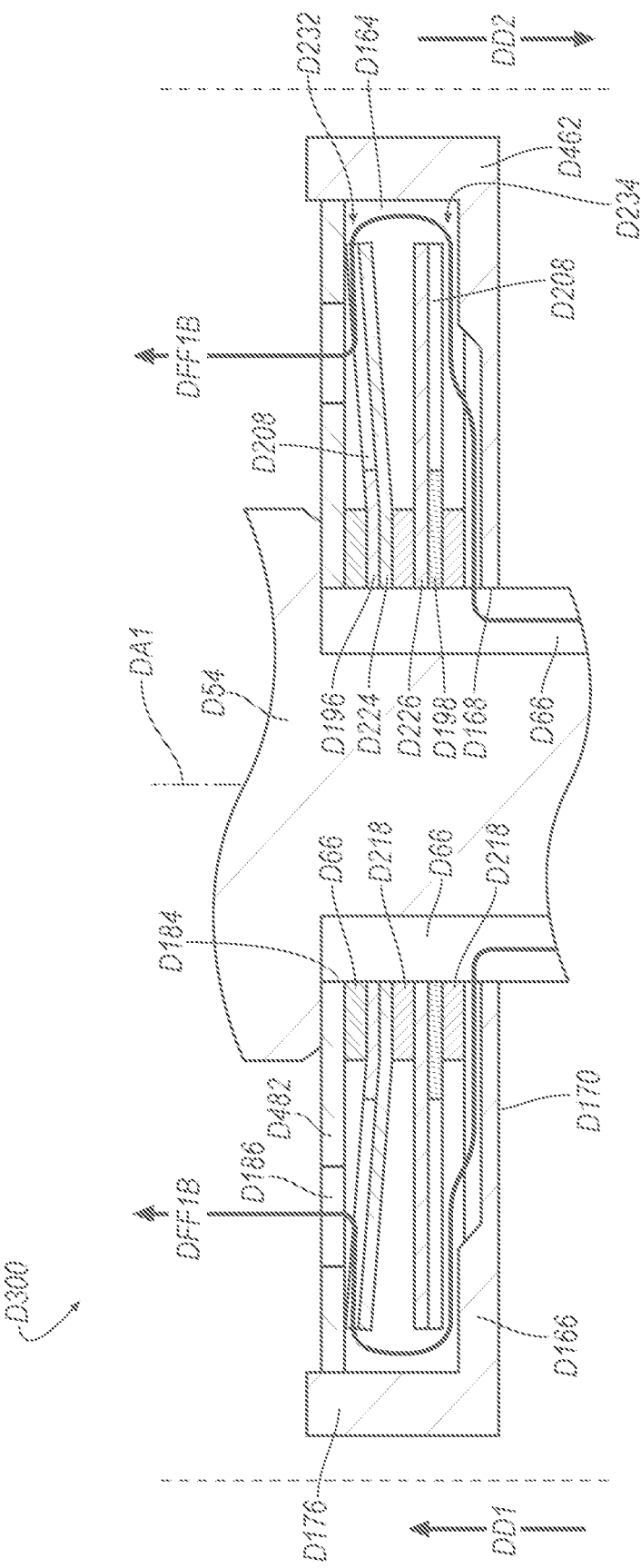
FIG. 30 is the cross section of FIG. 19 and illustrating the first fluid flow path when the damper assembly is moved toward the compressed position with the fluid flow rate and/or pressure differential above the first threshold.
Figure 39:
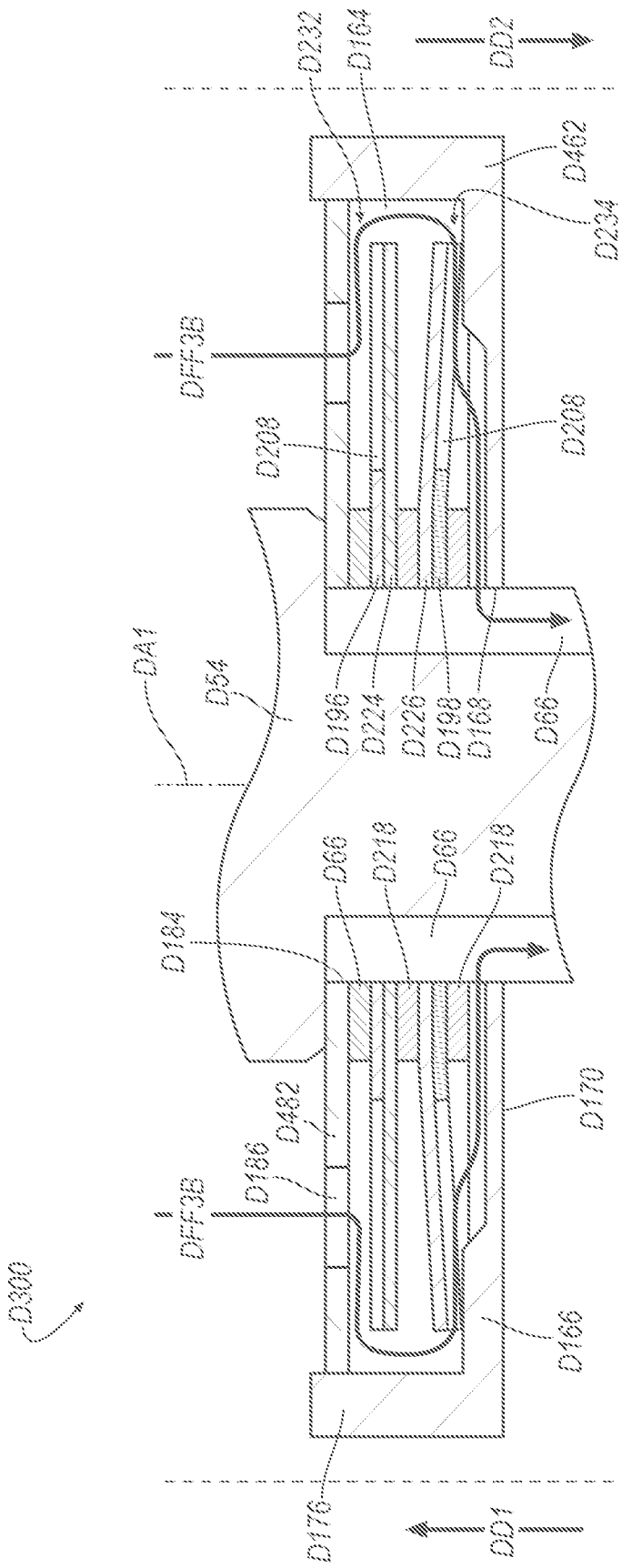
FIG. 39 is the cross section of FIG. 19 and illustrating the third fluid flow path when the damper assembly is moved toward the extended position with the fluid flow rate and/or pressure differential above the first threshold.

The first check disc D224 and the first orifice disc D196 in the unflexed position may be spaced from the top disc D482 and the second check disc D226 and the second orifice disc D198 in the unflexed position may be spaced from the bottom wall D166, as illustrated in FIG. 19. The first orifice disc D196 may abut the top disc D482 when the first check disc D224 is in the flexed position, as illustrated in FIG. 30. The second orifice disc D198 may abut the bottom wall D166 when the second check disc D226 is in the flexed position, as illustrated in FIG. 39.

Movement of the check disc D220, D222, D224, D226, D228, D230 toward another component of the damper assembly D200, D300 decreases the size of the opening D232, D234 therebetween through which fluid may flow. Decreasing the size of the opening D232, D234 increases resistance to motion provided the damper assembly D200, D300 by limiting fluid flow through the passages D64, D66. The check discs D220, D222, D224, D226, D228, D230 may be moved toward another component of the damper assembly D200, D300 only when the pressure differential and/or rate of fluid flow is greater than a threshold amount. The threshold amount may be determined based on desired response characteristics of the damper assembly D200, D300, and the check discs D220, D222, D224, D226, D228, D230 and other components of the damper assembly D200, D300 may be designed, e.g., via geometry such as thickness, material type, etc., to flex at the threshold amount.

Figure 26:
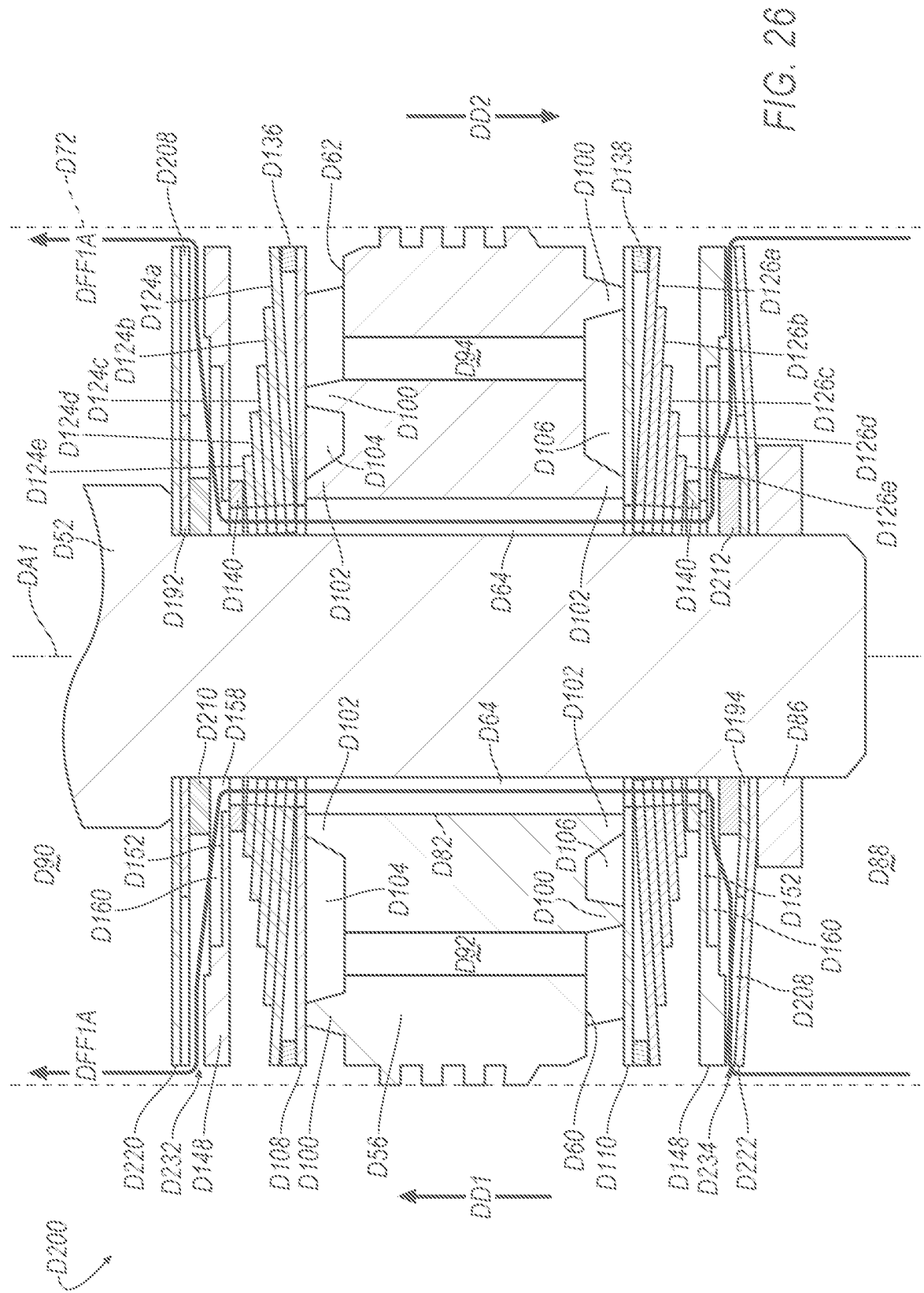
FIG. 26 is the cross section of FIG. 7 and illustrating the first fluid flow path when the damper assembly is moved toward the compressed position with the fluid flow rate and/or pressure differential above a first threshold.

When the damper assembly D200, D300 is moved toward the compressed position the check discs D220, D222, D224, D226, D228, D230 may be moved toward another component of the damper assembly D200, D300, e.g., to the flexed positions, and selectively restrict fluid flow in the first direction D1. For example, the second check disc D222 and the second orifice disc D194 may be moved toward the second flow disc D148, as illustrated in FIG. 26. As another example, the check disc D224 may be moved toward the top disc D182, D282 as illustrated in FIGS. 27 and 28. As another example, both check discs D228, D230 may by moved toward the top disc D382, as illustrated in FIG. 29. As another example, the first check disc D224 and the first orifice disc D196 may be moved toward the top disc D482, as illustrated in FIG. 30.

Figure 35:
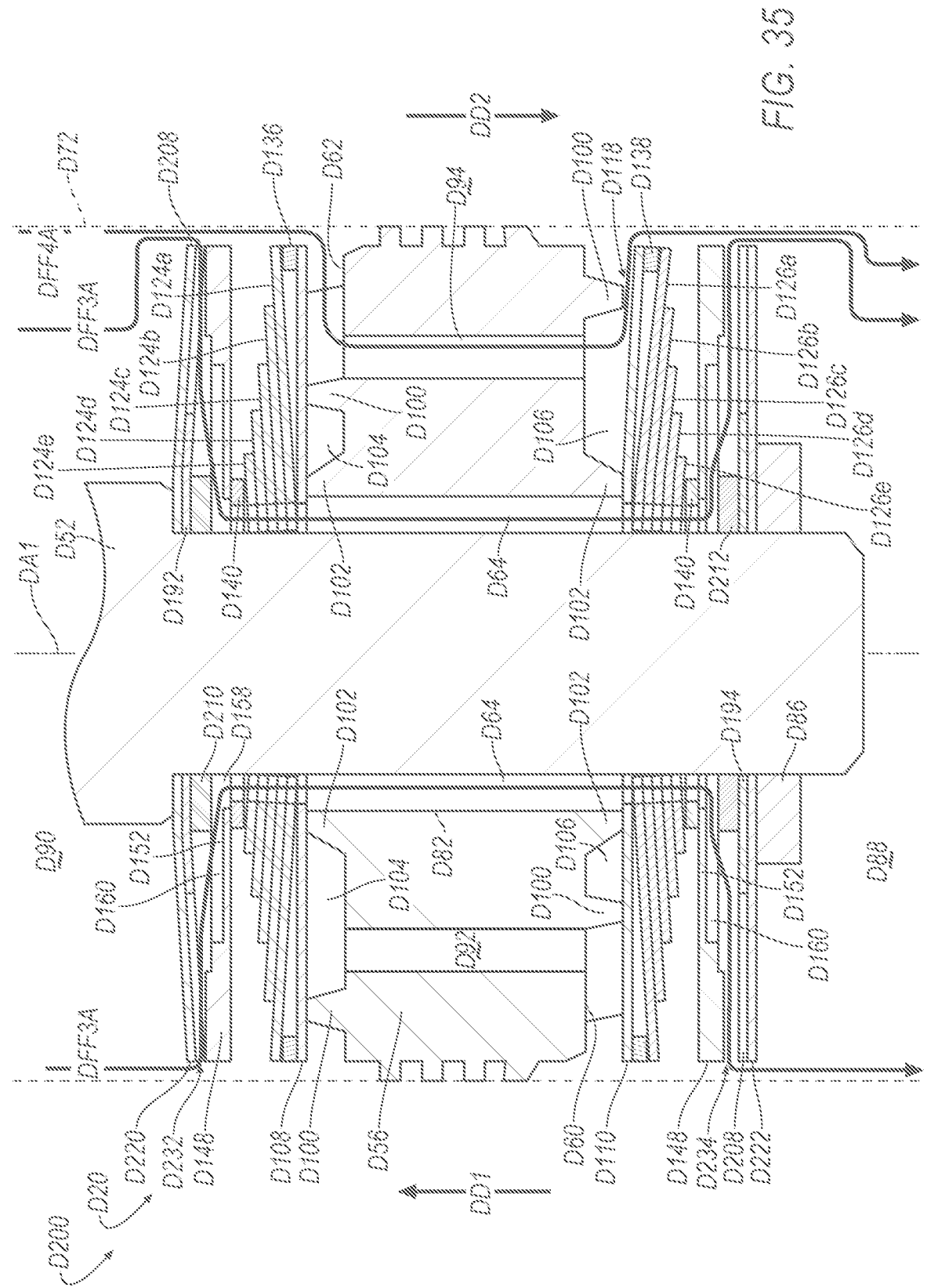
FIG. 35 is the cross section of FIG. 7 and illustrating a third fluid flow path and a fourth fluid flow path when the damper assembly is moved toward an extended position with the fluid flow rate and/or pressure differential above the second threshold.

When the damper assembly D200, D300 is moved toward the extended position the check discs D220, D222, D224, D226, D228, D230 may be moved toward another component of the damper assembly D200, D300, e.g., to the flexed positions, and selectively restrict fluid flow in the second direction D2. For example, the first check disc D220 and the first orifice disc D192 may be moved toward the first flow disc D148, as illustrated in FIG. 35. As another example, the check disc D224 may be moved toward the bottom wall D166, as illustrated in 37. As another example, both check discs D228, D230 may by moved toward the bottom wall D166, as illustrated in FIG. 38. As another example, the second check disc D226 and the second orifice disc D198 may be moved toward the bottom wall D166, as illustrated in FIG. 39.

The openings D232, D234 between the check discs D220, D222, D224, D226 and another component of the damper assembly D200, D300 may be defined by the orifices D208 of the orifice discs D192, D194, D196, D198 when the check discs D220, D222, D224, D226, D228, D230 are in the flexed positions. For example, a size of the openings D232, D234 may be defined by a cross sectional area of the orifice D208, e.g., as measured perpendicularly to a radius along which the respective orifice D208 extends.

The openings D232, D234 between the check discs D224, D226 and another component of the damper assembly D300 may be defined by the channels D180, D190 of the restriction ribs D178, D188 when the check discs D224, D226 are in the flexed positions. For example, a size of the openings D232, D234 may be defined by a cross sectional area of the channel D180, D190, e.g., as measured perpendicularly to a radius along which the respective channel D180, D190 extends.

The openings D228, D230 between the check discs D228, D230 and another component of the damper assembly D300 may be defined by the orifices D236, D238 of the check discs D228, D230 when the check discs D228, D230 are in the flexed positions. For example, a size of the openings D232, D234 may be defined by a cross sectional area of the orifices D236, D238, e.g., as measured perpendicularly to a radius along which the respective orifices D236, D238 extend.

Each damper assembly D300 may include a preload spacer D246. The preload spacer D246 may protect the discs D108, D110, D140, D124a-D124e, D126a-D126e, D140, D150. A thickness of the preload may increase or decrease space available for piston D58 and discs D108, D110, D140, D124a-D124e, D126a-D126e, D140, D150. For example, a thicker preload spacer D246 may provide relatively less space and a thinner preload spacers D246 may provide relatively more space.

With reference to FIGS. 20-24, first fluid flow paths DFF1A, DFF1B defined by the respective damper assemblies are illustrated. The first fluid flow paths DFF1A, DFF1B are defined when the respective damper assembly D200, D300 is moved toward the compressed position. The first fluid flow paths DFF1A, DFF1B in FIGS. 20-24 illustrate the respective damper assembly D200, D300 moved toward the compressed position when a fluid flow rate and/or a pressure differential between the compression sub-chamber D88 and the rebound sub-chamber D90 is less than a first threshold.

Figure 20:
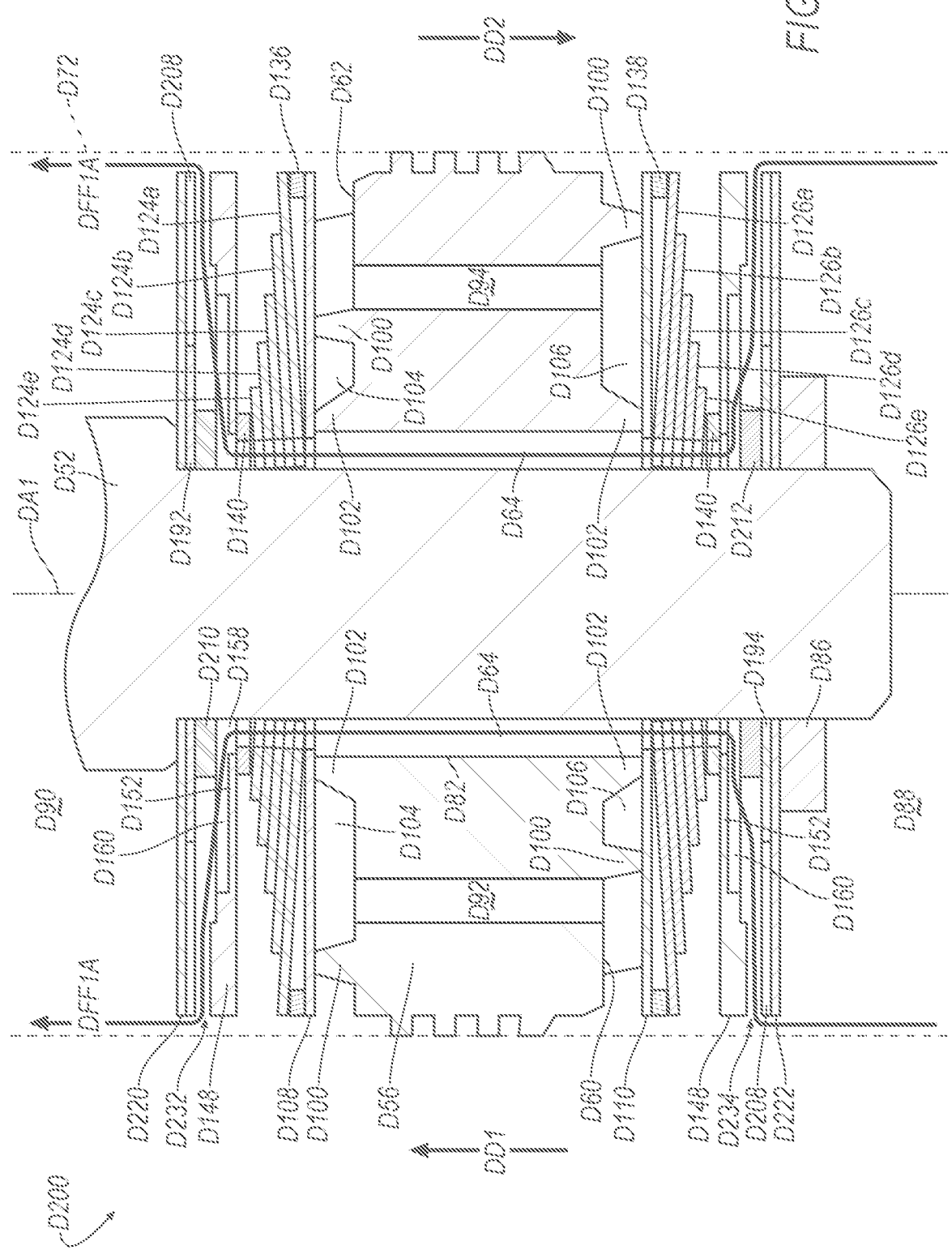
FIG. 20 is the cross section of FIG. 7 and illustrating a first fluid flow path when the damper assembly is moved toward a compressed position.
Figure 21:
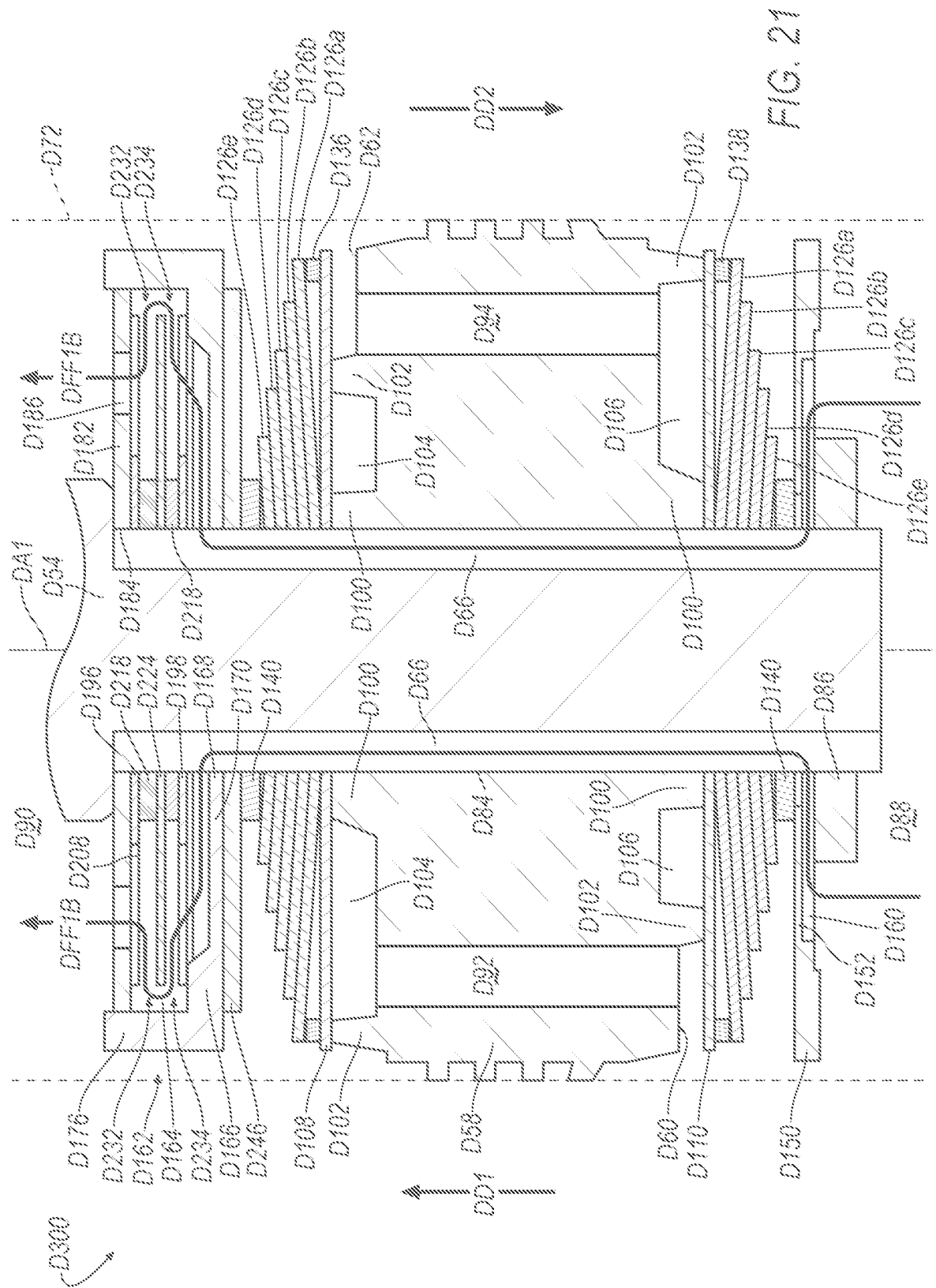
FIG. 21 is the cross section of FIG. 11 and illustrating a first fluid flow path when the damper assembly is moved toward the compressed position.
Figure 22:
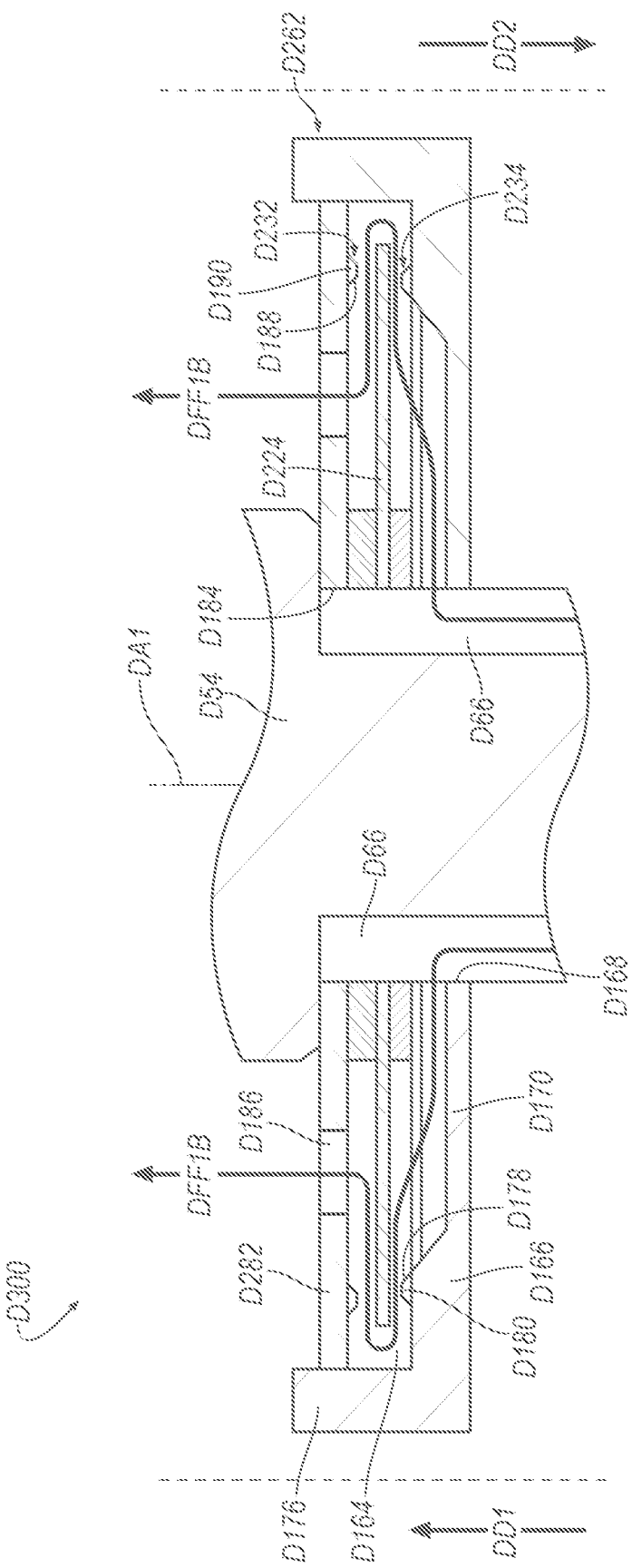
FIG. 22 is the cross section of FIG. 15 and illustrating a first fluid flow path when the damper assembly is moved toward the compressed position.
Figure 23:
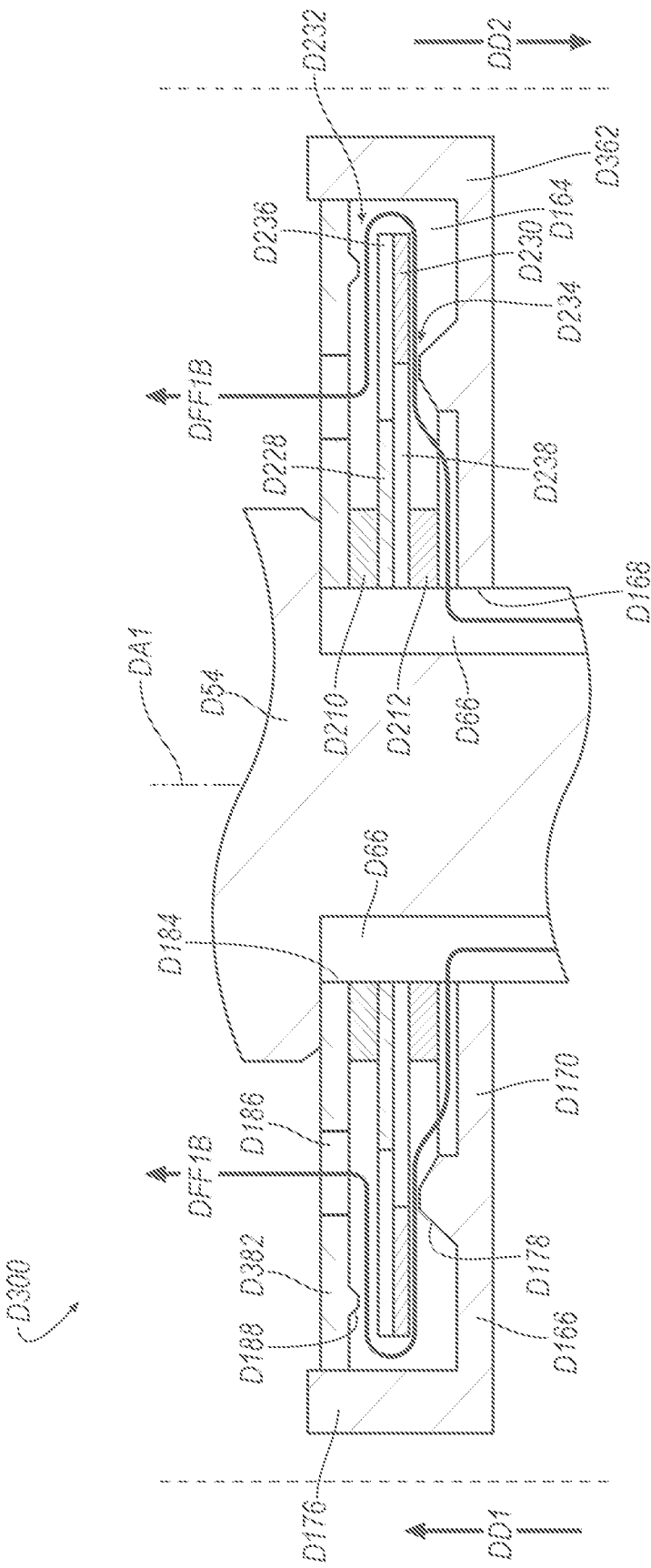
FIG. 23 is the cross section of FIG. 17 and illustrating a first fluid flow path when the damper assembly is moved toward the compressed position.
Figure 24:
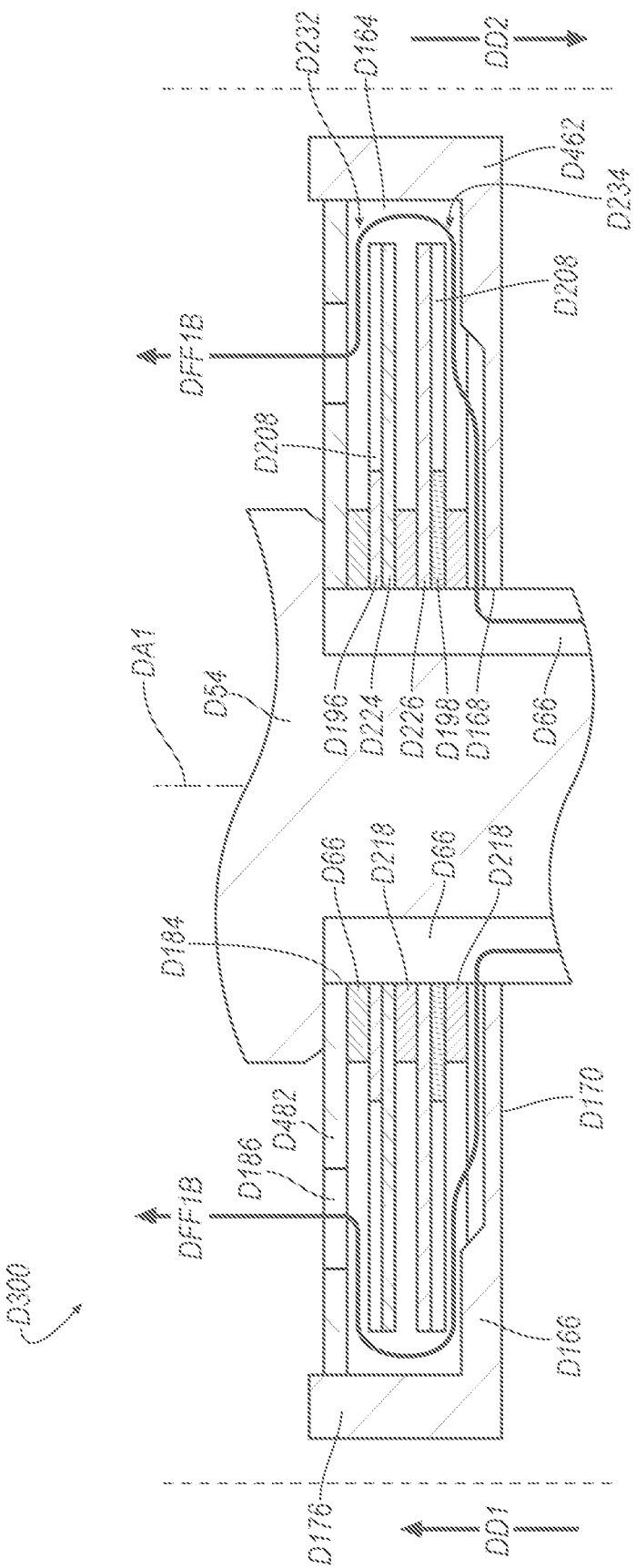
FIG. 24 is the cross section of FIG. 19 and illustrating a first fluid flow path when the damper assembly is moved toward the compressed position.

The first fluid flow path DFF1A illustrated in FIG. 20 extends from the compression sub-chamber D88 through the opening between the second check disc D220, D222, D224, D226, D228, D230 and the second flow disc D148, D150 to the passage D64, D66 via the radial passage D160 of the second flow disc D148, D150. From the passage D64, D66, the first fluid flow path DFF1A extends through the radial passage D160 of the first flow disc D148, D150 to the rebound sub-chamber D90 via the opening between the first check disc D220, D222, D224, D226, D228, D230 and the first flow disc D148, D150.

The first fluid flow path DFF1B illustrated in FIGS. 21-24 extends from the compression sub-chamber D88 through the radial passage D160 of the flow disc D148, D150 to the passage D64, D66. From the passage D64, D66, the first fluid flow path flow into the chamber D74 via the radial passage D160 of the bottom wall D166 of the housing D162, D262, D362, D462 around the check disc D220, D222, D224, D226, D228, D230(s) to the rebound sub-chamber D90 via the opening in the top disc D182, D282, D382, D482.

The first fluid flow paths DFF1A, DFF1B each define an area, e.g., perpendicular to the respective first fluid flow path DFF1A, DFF1B, through which fluid may flow. The defined area may be at narrowest portion of the respective first fluid flow path DFF1A, DFF1B. The defined area may include multiple areas. For example, the first fluid flow paths DFF1A, DFF1B may split into multiple sub-paths, e.g., with each sub-path extending through one of the passages D64, D66. The sub-paths may each have a sub-area at a narrowest portion of the respective sub-path, and the defined area of the respective first fluid flow path DFF1A, DFF1B may be a combination of the areas of the sub-paths. Flow through the first fluid flow paths DFF1A, DFF1B may provide bleed flow to equalize the pressure differential between the compression sub-chamber D88 and the rebound sub-chamber D90.

Figure 25:
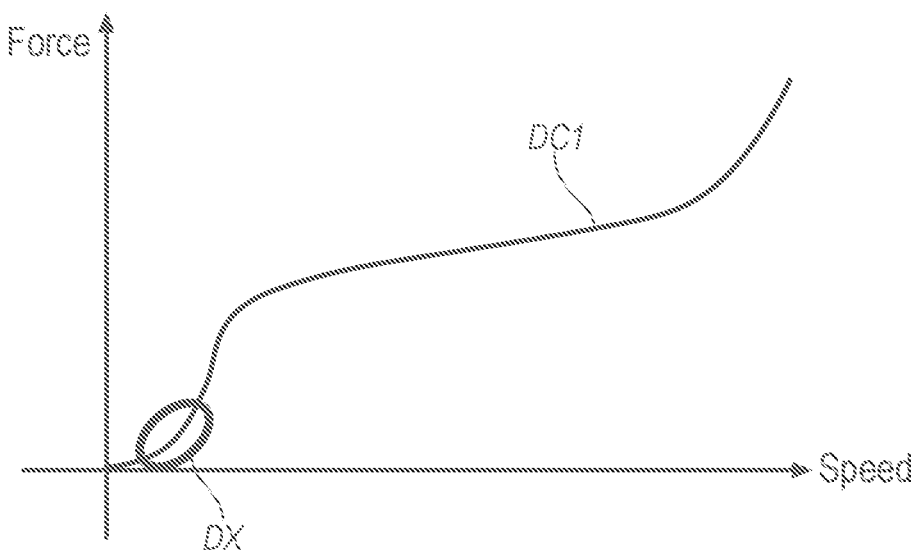
FIG. 25 is an illustration of a force response curve D of the damper assembly moving toward the compressed position, the illustration identifying a first portion of the curve.

When the fluid flow rate and/or pressure differential between the compression sub-chamber D88 and the rebound sub-chamber D90 is less than the first threshold, the areas defined by the first fluid flow paths DFF1A, DFF1B provide resistance to movement of the piston D56, D58 by limiting a rate at which fluid may flow from the compression sub-chamber D88 to the rebound sub-chamber D90. Such resistance is illustrated in FIG. 25 by a section DX of the curve DC1.

With reference to FIGS. 26-30, the respective damper assembly D200, D300 is illustrated as moved toward the compressed position when the fluid flow rate and/or the pressure differential between the rebound sub-chamber D90 and the compression sub-chamber D88 is greater than the first threshold. The first threshold may be such that a magnitude of the curve DC1 reaches a predetermined amount of response force within a predetermined amount of time. The predetermined amounts may be based on empirical testing, e.g., to optimize vehicle D50 performance and/or occupant comfort.

When the fluid flow rate and/or the pressure differential are greater than the first threshold, the fluid flow along the first fluid flow path DFF1A, DFF1B moves the respective check disc D220, D222, D224, D226, D228, D230 towards another component of the damper assembly D200, D300, e.g., to the flexed position. Moving the check disc D220, D222, D224, D226, D228, D230 towards another component of the damper assembly D200, D300 decreases the size of the opening therebetween.

For example, the second orifice disc D192, D194, D196, D198 illustrated in FIG. 26 may be moved into abutment with the second flow disc D148, D150 and with the second check disc D220, D222, D224, D226, D228, D230 abutting the second orifice disc D192, D194, D196, D198 opposite the second flow disc D148, D150, thereby minimizing the size of the opening, e.g., to be generally equal to the radial flow area of the orifices D208 of the of the second orifice disc D192, D194, D196, D198.

As another example, the check disc D220, D222, D224, D226, D228, D230 illustrated in FIG. 73 may moved into abutment with the first orifice disc D192, D194, D196, D198, thereby minimizing the size of the opening, e.g., to be generally equal to the radial flow area of the orifices D208 of the of the first orifice disc D192, D194, D196, D198.

As another example, the check disc D220, D222, D224, D226, D228, D230 illustrate in FIG. 28 may be moved in the abutment with the top disc D182, D282, D382, D482, e.g., abutting the restriction rib D178, and thereby minimizing the size of the opening, e.g., to be generally equal to the radial flow area of the channel of the of the restriction rib D178.

As another example, the first check disc D220, D222, D224, D226, D228, D230 illustrated in FIG. 29 may be moved into abutment with the top disc D182, D282, D382, D482, e.g., abutting the restriction rib D178, and with the second check disc D220, D222, D224, D226, D228, D230 abutting the first check disc D220, D222, D224, D226, D228, D230 opposite the top disc D182, D282, D382, D482. Such movement minimizes the size of the opening, e.g., to be generally equal to the radial flow area of the opening of the first check disc D220, D222, D224, D226, D228, D230.

As yet another example, the first orifice disc D192, D194, D196, D198 illustrated in FIG. 30 may be moved into abutment with the top disc D182, D282, D382, D482 and with the first check disc D220, D222, D224, D226, D228, D230 abutting the first orifice disc D192, D194, D196, D198 opposite the top disc D182, D282, D382, D482, thereby minimizing the size of the opening, e.g., to be generally equal to the radial flow area of the orifices D208 of the of the first orifice disc D192, D194, D196, D198.

Figure 31:
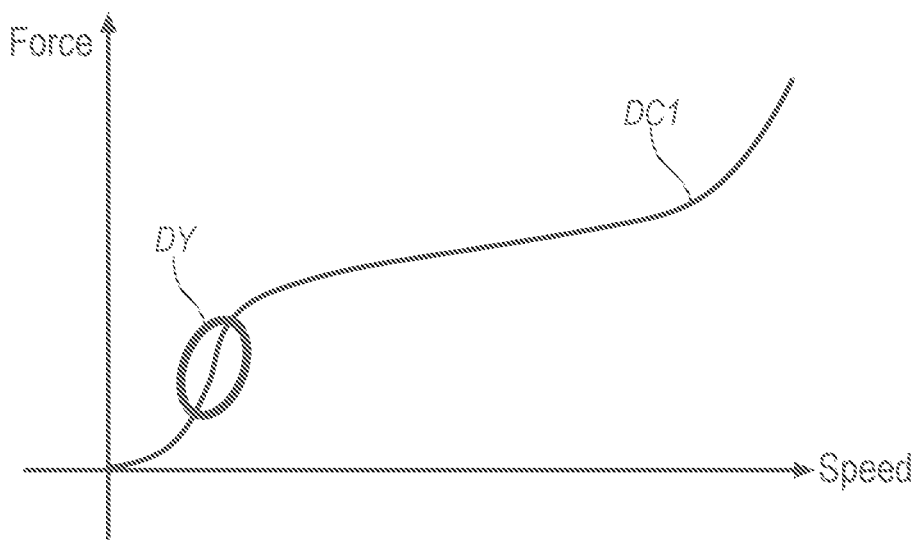
FIG. 31 is an illustration of the force response curve D of the damper assembly moving toward the compressed position with the fluid flow rate and/or pressure differential above the first threshold, the illustration identifying a second portion of the curve.

Decreasing and/or minimizing the size of the openings decreases the defined area of the respective first fluid flow path DFF1A, DFF1B, and increases resistance to movement of the respective damper assembly D200, D300 by reducing the rate at which fluid may flow from the compression sub-chamber D88 to the rebound sub-chamber D90. Such resistance is illustrated in FIG. 31 by a section DY of the curve DC1.

Figure 32:
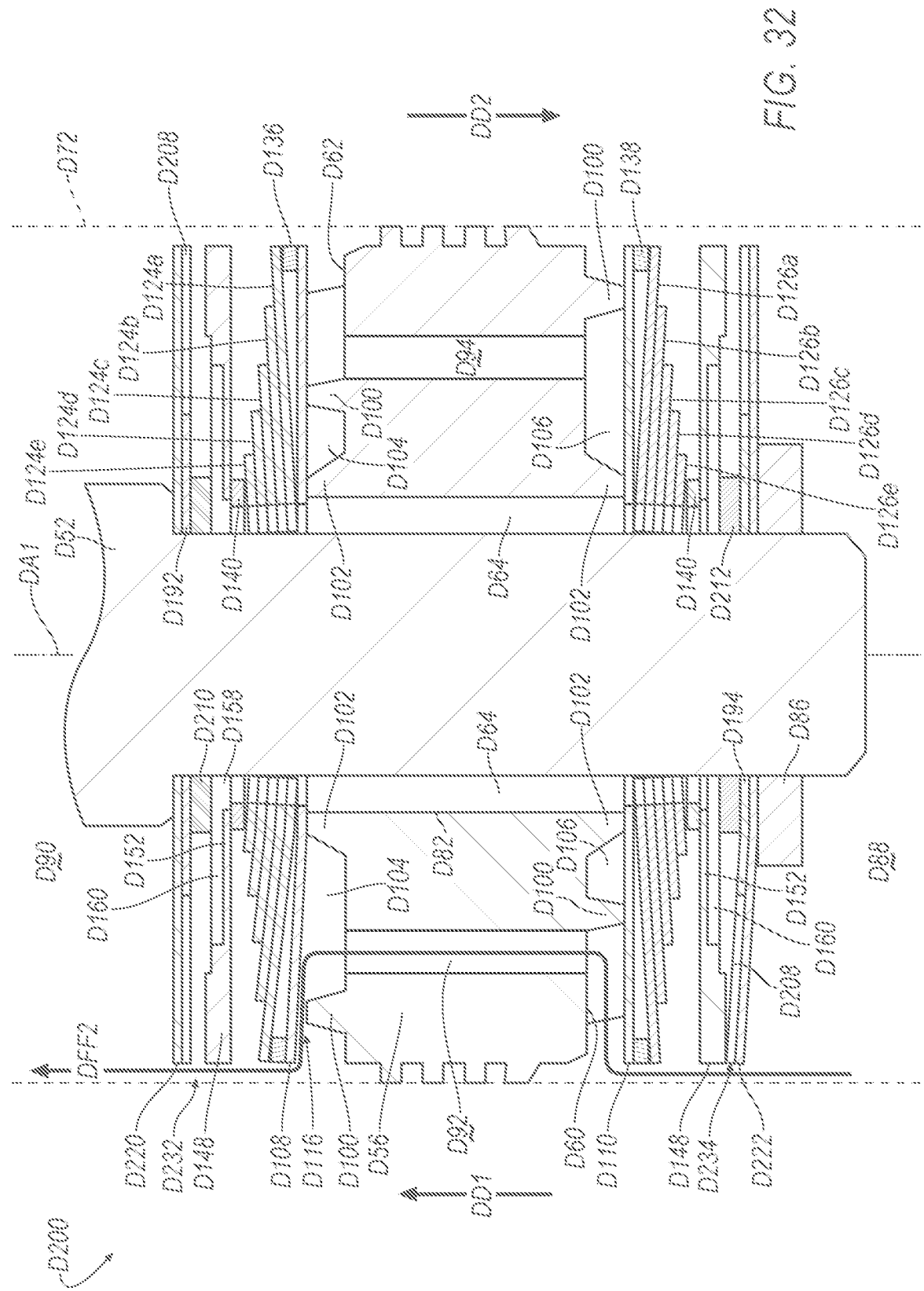
FIG. 32 is the cross section of FIG. 7 and illustrating the first fluid flow path and a second fluid flow path when the damper assembly is moved toward the compressed position with the fluid flow rate and/or pressure differential above a second threshold.
Figure 33:
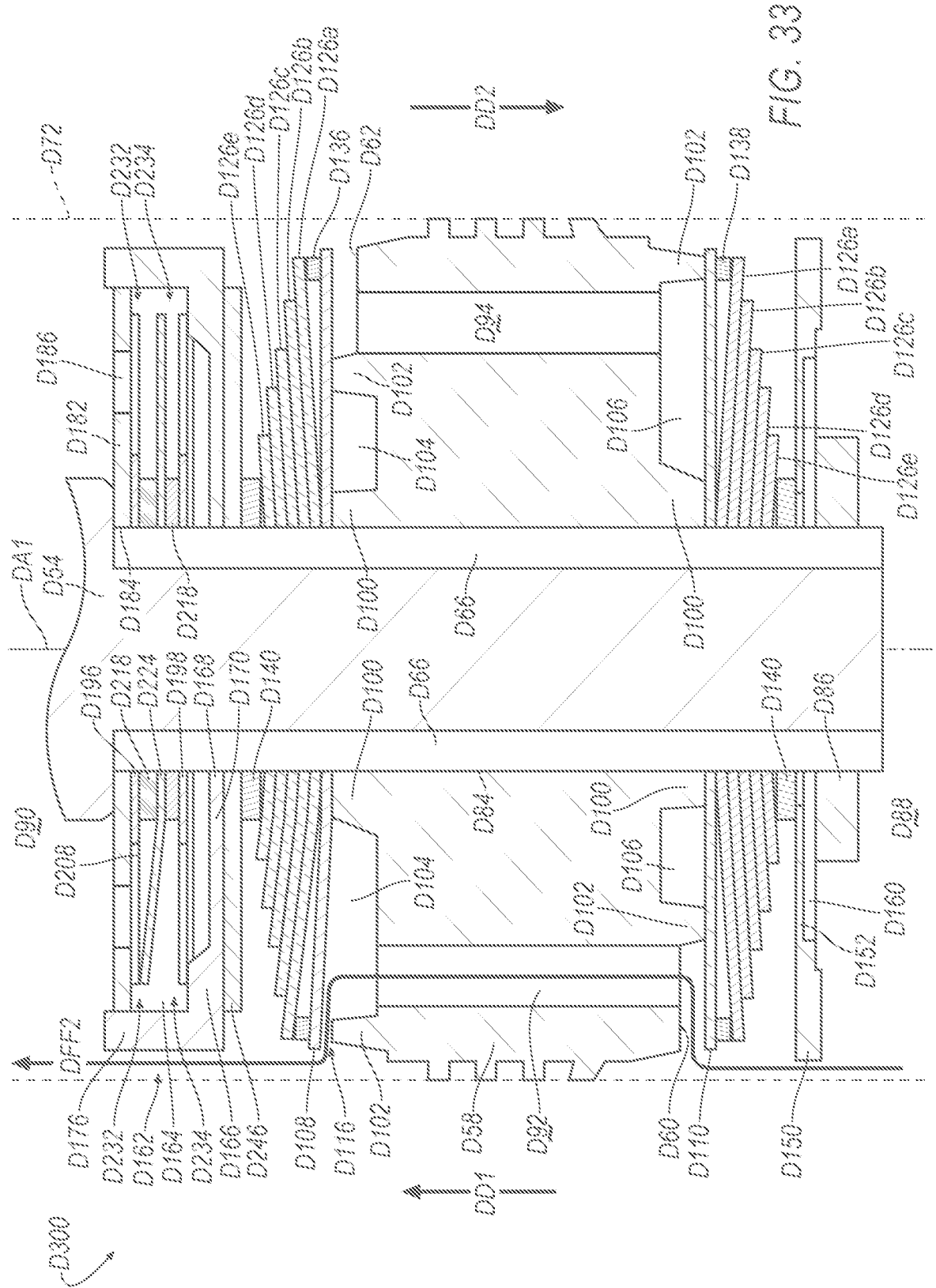
FIG. 33 is the cross section of FIG. 11 and illustrating the first fluid flow path and a second fluid flow path when the damper assembly is moved toward the compressed position with the fluid flow rate and/or pressure differential above the second threshold.

With reference to FIGS. 32 and 33, a second fluid flow path DFF2 defined by each damper assembly D200, D300 is illustrated. The second fluid flow path DFF2 is defined when the respective damper assembly D200, D300 is moved toward the compressed position and the fluid flow rate and/or the pressure differential between the compression sub-chamber D88 and the rebound sub-chamber D90 is greater than a second threshold. The second threshold may be greater than the first threshold such that a slope and/or magnitude of the curve DC1 does not exceed a predetermined amount. The predetermined amount may be based on empirical testing, e.g., to optimize vehicle D50 performance and/or occupant comfort.

When the fluid flow rate and/or pressure differential is above the second threshold the first blow off disc D108 and the first spring discs D124a-D124e are urged away from the piston D56, D58 and the opening therebetween is created. The second fluid flow path DFF2 extends from the compression sub-chamber D88 to the rebound sub-chamber D90 via the first blow off passages D92 and the opening between the piston D56, D58 and the first blow off disc D108. The second fluid flow path DFF2 defines an area through which fluid may flow. The defined area of the second fluid flow path DFF2 may include multiple sub-areas.

Figure 34:
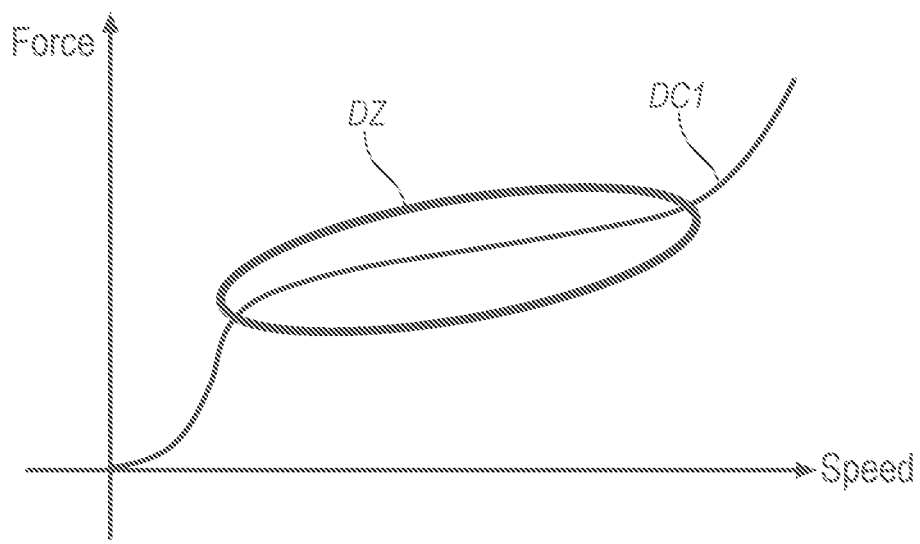
FIG. 34 is an illustration of a force response curve D of the damper assembly moving toward the compressed position, the illustration identifying a third portion of the curve.

The combined defined areas of the first fluid flow path DFF1A, DFF1B and the second fluid flow path DFF2 reduce resistance to movement of the respective damper assembly D200, D300 (relative to the defined area of just the first fluid flow path DFF1A, DFF1B) by increasing a rate at which fluid may flow from the compression sub-chamber D88 to the rebound sub-chamber D90. Such resistance is illustrated in FIG. 34 by a section DZ of the curve DC1.

With reference to FIGS. 35-65, a third fluid flow path DFF3A, DFF3B and a fourth fluid flow path DFF4 defined by the respective damper assemblies are illustrated. The third and fourth fluid flow paths DFF3A, DFF3B DFF4, may be defined when the respective damper assembly D200, D300 is moved toward the extended position and the fluid flow rate and/or the pressure differential between the compression sub-chamber D88 and the rebound sub-chamber D90 is above the second threshold.

The third fluid flow path DFF3A illustrated in FIG. 35 extends from the rebound sub-chamber D90 to the compression sub-chamber D88 via, the passages D64, D66, and the <paths> of the flow discs D148, D150 the opening between the first check disc D220, D222, D224, D226, D228, D230 and the first flow disc D148, D150, e.g., through the orifices D208 of the first orifice disc D192, D194, D196, D198.

The third fluid flow path DFF3B illustrated in FIG. 36 extends from the rebound sub-chamber D90 to the compression sub-chamber D88 via the opening in the top disc D182, D282, D382, D482, the chamber D74 of the housing D162, D262, D362, D462, and the passages D64, D66. The third fluid flow path DFF3B illustrated in FIG. 36 extends through the opening between the check disc D220, D222, D224, D226, D228, D230 and the bottom wall D166 of the housing D162, D262, D362, D462, e.g., via the orifice D208 of the second orifice disc D192, D194, D196, D198. The third fluid flow path DFF3B illustrated in FIG. 37 extends through housing D162, D262, D362, D462 by way of the opening between the check disc D220, D222, D224, D226, D228, D230 and the bottom wall D166 of the housing D162, D262, D362, D462, e.g., via the channel of the restriction rib D178. The third fluid flow path DFF3B illustrated in FIG. 38 extends through housing D162, D262, D362, D462 by way of the opening between the check disc D220, D222, D224, D226, D228, D230 and the bottom wall D166 of the housing D162, D262, D362, D462, e.g., via the channel of the restriction rib D178. The third fluid flow path DFF3B illustrated in FIG. 39 extends through housing D162, D262, D362, D462 by way of the opening between the second check disc D220, D222, D224, D226, D228, D230 and the bottom wall D166 of the housing D162, D262, D362, D462, e.g., via the orifice D208 of the second orifice disc D192, D194, D196, D198.

The fourth fluid flow path DFF4, illustrated in FIGS. 35 and 36, extends from the rebound sub-chamber D90 to the compression sub-chamber D88 via the second blow off passages D94 and the opening between the second blow off disc D110 and the piston D56, D58.

Figure 40:
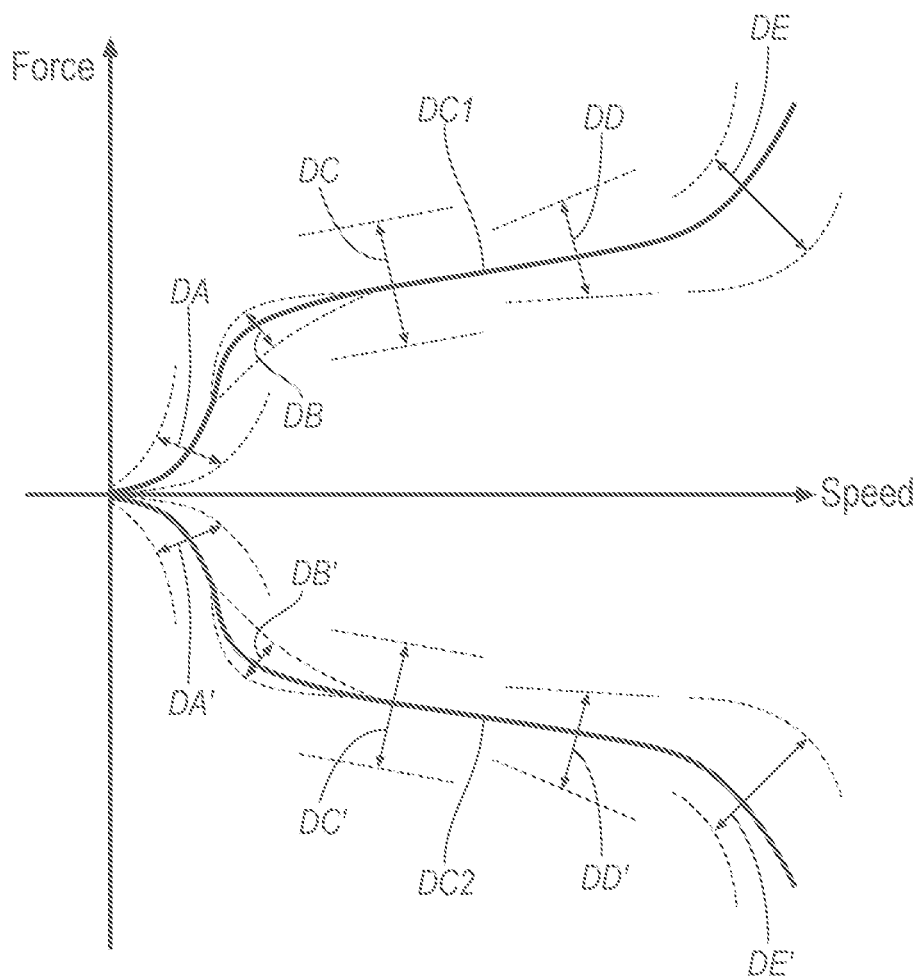
FIG. 40 is an illustration of the force response curve D of the damper assembly moving toward the compressed position and a force response curve D of the damper assembly moving toward the compressed position.

With reference to FIG. 40, the curve DC1 and the curve DC2 are shown. The curve DC1 indicates response force provided by the damper assembly D200, D300 D200, D300 moving toward the compressed position at increased speeds. The curve DC2 indicates response force provided by the damper assembly D200, D300 moving toward the extended position at increased speeds. The various components of the damper assembly D200, D300 may be configured to control the curves DC1, DC2, i.e., to control an amount of responsive force provided by the damper assembly D200, D300 at various speeds.

The curves DC1, DC2 may be increased or decreased in slope and/or in magnitude proximate arrows DA and DA', e.g., providing tuning for low speed movement of the damper assembly D200, D300. For example, increasing a stiffness of the check disc D220, D222, D224, D226, D228, D230, and/or increasing a size of the orifice D208 of the orifice disc D192, D194, D196, D198, and/or increasing a size of the opening of the check disc D220, D222, D224, D226, D228, D230 may decrease the slope and/or magnitude of the curve DC1 proximate arrow DA. Similarly increasing a stiffness of the check disc D220, D222, D224, D226, D228, D230, and/or increasing a size of the orifice D208 of the orifice disc D192, D194, D196, D198, and/or increasing a size of the opening of the check disc D220, D222, D224, D226, D228, D230 may decrease the slope and/or magnitude of the curve DC2 proximate arrow DA'. As another example, decreasing a stiffness of the check disc D220, D222, D224, D226, D228, D230, and/or decreasing a size of the orifice D208 of the orifice disc D192, D194, D196, D198, and/or decreasing a size of the opening of the check disc D220, D222, D224, D226, D228, D230 may increase the slope and/or magnitude of the curve DC1 proximate arrow DA. Similarly decreasing a stiffness of the check disc D220, D222, D224, D226, D228, D230, and/or decreasing a size of the orifice D208 of the orifice disc D192, D194, D196, D198, and/or decreasing a size of the opening of the check disc D220, D222, D224, D226, D228, D230 may increase the slope and/or magnitude of the curve DC2 proximate arrow DA'.

The curves DC1, DC2 may be increased or decreased in slope and/or in magnitude proximate arrows DB and DB'. For example, increasing a stiffness of the first blow off disc D108 may increase the slope and/or magnitude of the curve DC1 proximate arrow DB. Similarly, increasing a stiffness of the second blow off disc D110 may increase the slope and/or magnitude of the curve DC2 proximate arrow DB'. As another example, decreasing the stiffness of the first blow off disc D108 may decrease the slope and/or magnitude of the curve DC1 proximate arrow DB. Similarly, decreasing stiffness of the second blow off disc D110 may decrease the slope and/or magnitude of the curve DC2 proximate arrow DB'.

The curves DC1, DC2 may be increased or decreased in slope and/or in magnitude proximate arrows DC and DC', e.g., providing tuning for mid speed movement of the damper assembly D200, D300. For example, decreasing a thickness of the ring D136 may decrease the slope and/or magnitude of the curve DC1 proximate arrow DC. Similarly, decreasing a thickness of the ring D138 may decrease the slope and/or magnitude of the curve DC2 proximate arrow DC'. As another example, increasing the thickness of the ring D136 may increase the slope and/or magnitude of the curve DC1 proximate arrow DC. Similarly, increasing the thickness of the ring D138 may increase the slope and/or magnitude of the curve DC2 proximate arrow DC'.

The curves DC1, DC2 may be increased or decreased in slope and/or in magnitude proximate arrows DD and DD'. For example, increasing a stiffness of the first spring discs D124a-D124e may increase the slope and/or magnitude of the curve DC1 proximate arrow DD. Similarly, increasing a stiffness of the second spring discs D126a-D126e may increase the slope and/or magnitude of the curve DC2 proximate arrow DD'. As another example, decreasing the stiffness of the first spring discs D124a-D124e may decrease the slope and/or magnitude of the curve DC1 proximate arrow DD. Similarly, decreasing the thickness of the second spring discs D126a-D126e may decrease the slope and/or magnitude of the curve DC2 proximate arrow DD'.

The curves DC1, DC2 may be increased or decreased in slope and/or in magnitude proximate arrows DE and DE', e.g., to control high speed response. For example, decreasing a size of the first blow off passages D92 may increase the slope and/or magnitude of the curve DC1 proximate arrow DE. Similarly, decrease a size of the second blow off passages D94 may increase the slope and/or magnitude of the curve DC2 proximate arrow DE'. As another example, increasing the size of the first blow off passages D92 may decrease the slope and/or magnitude of the curve DC1 proximate arrow DE. Similarly, increasing the size the second blow off passages D94 may decrease the slope and/or magnitude of the curve DC2 proximate arrow DE'. Additionally or alternately, a restriction disc (not shown) that covers a portion of the respective blow off passage D64, D66 and/or deifies an opening of a certain size may increase or decrease the slope and/or the magnitude of the curves C1 and C2 proximate arrows E and E'.

Although the curves DC1, DC2 proximate the various arrows DA, DA', DB, DB', DC, DC', DD, DD', DE, DE' are described individually, the curves DC1, DC2 may be controlled based on a cumulative effect of the configuration of the various components. For example, configuring the damper assembly D200, D300 D20 to control the curves DC1, DC2 proximate arrows DA, DA', may also change the curves DC1, DC2, proximate the other arrows DB, DB', DC, DC', DD, DD', DE, DE'.

The adjectives "first," "second," and "third" are used as identifiers and are not intended to indicate significance or order.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A damper assembly, comprising:
 a rod elongated along an axis;
 a piston supported by the rod, the piston having a compression surface and a rebound surface opposite the compression surface;
 a first passage extending between the piston and the rod from the compression surface to the rebound surface of the piston;
 a check disc supported by the rod, the check disc movable from an unflexed position to a flexed position to increase resistance to fluid flow through the first passage;
 a housing supported by the rod, the housing defining a chamber in fluid communication with the first passage, the check disc being in the chamber; and an orifice disc in the chamber.

2. The damper assembly of claim 1, wherein the piston defines a second passage extending from the compression surface to the rebound surface, and further comprising a blow off disc supported by the rod and selectively permitting fluid flow out of the second passage of the piston, the first passage extending between the rod and the blow off disc.

3. The damper assembly of claim 2, further comprising a spring disc supported by the rod and urging the blow off disc toward the piston, the first passage extending between the rod and the spring disc.

4. The damper assembly of claim 3, wherein the piston, the blow off disc, and the spring disc each include a notch, the first passage extending through the notches.

5. The damper assembly of claim 4, wherein the piston, the blow off disc, and the spring disc each include a second notch, and the rod includes a rib disposed in the second notches.

6. The damper assembly of claim 1, wherein the rod includes an axially elongated flat defining the first passage.

7. The damper assembly of claim 1, further comprising a flow disc supported by the rod, the flow disc defining a radial passage in fluid communication with the first passage.

8. The damper assembly of claim 1, wherein the check disc is movable from the unflexed position to a second flexed position, the check disc restricting fluid flow through the first passage in a first direction in the flexed position and restricting fluid flow through the first passage in a second direction opposite the first direction in the second flexed position.

9. The damper assembly of claim 1, further comprising a second check disc supported by the rod, the check disc restricting fluid flow through the first passage in a first direction in the flexed position, and the second check disc selectively restricting fluid flow through the first passage in a second direction opposite the first direction.

10. The damper assembly of claim 1, wherein the check disc is movable from the unflexed position toward the housing to the flexed position.

11. The damper assembly of claim 1, wherein the housing includes a rib extending toward the check disk.

12. The damper assembly of claim 11, wherein the rib includes a channel.

13. The damper assembly of claim 1, further comprising a second orifice disc in the chamber, the check disc between the orifice disc and the second orifice disc.

14. The damper assembly of claim 1, further comprising a top disc further defining the chamber, the top disc having an opening in fluid communication with the chamber.

15. The damper assembly of claim 14, wherein the top disc includes a rib that extends toward the housing.

16. The damper assembly of claim 15, wherein the rib defines a channel.

17. The damper assembly of claim 1, further comprising a second check disc in the chamber, the check disc restricting fluid flow through the first passage in a first direction in the flexed position, and the second check disc selectively restricting fluid flow through the first passage in a second direction opposite the first direction.

18. A damper assembly, comprising:
 a rod elongated along an axis;
 a piston supported by the rod, the piston having a compression surface and a rebound surface opposite the compression surface;
 a first passage between the piston and the rod, the first passage extending from the compression surface of the piston to the rebound surface of the piston;
 a second passage extending from the compression surface to the rebound surface;

a blow off disc supported by the rod and selectively permitting fluid flow out of the second passage of the piston, the first passage extending between the rod and the blow off disc;

a spring disc supported by the rod and urging the blow off disc toward the piston, the first passage extending between the rod and the spring disc; and the piston, the blow off disc, and the spring disc each including a notch, the first passage extending between the rod and the spring disc.

19. A damper assembly, comprising:

a rod elongated along an axis; and a piston supported by the rod, the piston having a compression surface and a rebound surface opposite the compression surface;

a passage between the piston and the rod, the passage extending from the compression surface of the piston to the rebound surface of the piston;

a check disc supported by the rod, the check disc selectively restricting fluid flow through the passage;

a housing supported by the rod, the housing defining a chamber in fluid communication with the passage, the check disc being positioned within the housing and in the chamber, the housing including a rib extending toward the check disk.

* * * * *